United States Patent
Hirose et al.

(10) Patent No.: US 9,742,007 B2
(45) Date of Patent: Aug. 22, 2017

(54) ACTIVE MATERIAL, ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Sony Corporation, Tokyo (JP)

(72) Inventors: Takakazu Hirose, Kanagawa (JP); Kenichi Kawase, Kanagawa (JP); Toshio Nishi, Saitama (JP); Isao Koizumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 542 days.

(21) Appl. No.: 14/192,461

(22) Filed: Feb. 27, 2014

(65) Prior Publication Data

US 2015/0243977 A1 Aug. 27, 2015

(51) Int. Cl.
*H01M 4/38* (2006.01)
*H01M 4/485* (2010.01)
*H01M 4/58* (2010.01)
*H01M 4/62* (2006.01)
(Continued)

(52) U.S. Cl.
CPC ............ *H01M 4/386* (2013.01); *H01M 4/485* (2013.01); *H01M 4/5825* (2013.01); *H01M 4/62* (2013.01); *H01M 4/366* (2013.01); *H01M 4/661* (2013.01); *H01M 4/663* (2013.01); *H01M 4/666* (2013.01); *H01M 2220/20* (2013.01); *H01M 2220/30* (2013.01)

(58) Field of Classification Search
CPC .... H01M 4/386; H01M 4/485; H01M 4/5825; H01M 4/62; H01M 4/366; H01M 4/663; H01M 4/666
See application file for complete search history.

(56) References Cited

U.S. PATENT DOCUMENTS

2009/0202911 A1 8/2009 Fukuoka et al.
2013/0089785 A1 4/2013 Yasuda et al.
(Continued)

FOREIGN PATENT DOCUMENTS

| CN | 101504980 A | 8/2009 |
|---|---|---|
| JP | 2997741 | 1/2000 |
| JP | 2009-212074 | 9/2009 |

(Continued)

OTHER PUBLICATIONS

Notification of Reason(s) for Refusal issued in connection with Japanese Patent Application No. 2013-044020, dated Jun. 23, 2015. (13 pages).

(Continued)

*Primary Examiner* — Jayne Mershon
(74) *Attorney, Agent, or Firm* — K&L Gates LLP

(57) ABSTRACT

A secondary battery includes: a cathode; an anode including an active material; and an electrolytic solution, wherein the active material includes a central section and a covering section provided on a surface of the central section, the central section includes silicon (Si) as a constituent element, the covering section includes carbon (C) and hydrogen (H) as constituent elements, and one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

14 Claims, 10 Drawing Sheets

(51) Int. Cl.
H01M 4/36 (2006.01)
H01M 4/66 (2006.01)

(56) References Cited

U.S. PATENT DOCUMENTS

2013/0149606 A1    6/2013  Yasuda et al.
2015/0340687 A1*  11/2015  Put .................... H01M 4/364
                                                429/231.5

FOREIGN PATENT DOCUMENTS

| JP | 2011-076788 | 4/2011 |
| JP | 2011-090869 | 5/2011 |
| JP | 2011-100745 | 5/2011 |
| JP | 2011-233497 | 11/2011 |
| JP | 4985949 B2 | 5/2012 |
| JP | 2012-221758 | 11/2012 |
| JP | 2013-008587 | 1/2013 |
| WO | 2011/158459 | 12/2011 |
| WO | 2012/026067 | 3/2012 |
| WO | 2012/077268 | 6/2012 |
| WO | 2012/144177 | 10/2012 |

OTHER PUBLICATIONS

Chinese Office Action (with English translation) issued Jan. 24, 2017 in corresponding Chinese application No. 201410069816X (17 pages).

* cited by examiner

ACTIVE MATERIAL, ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCES TO RELATED APPLICATIONS

The present application claims priority to Japanese Priority Patent Application JP 2013-044020 filed in the Japan Patent Office on Mar. 6, 2014, the entire content of which is hereby incorporated by reference.

BACKGROUND

The present application relates to an active material including silicon (Si) as a constituent element, to an electrode and a secondary battery that use the active material, and to a battery pack, an electric vehicle, an electric power storage system, an electric power tool, and an electronic apparatus that use the secondary battery.

In recent years, various electronic apparatuses such as a mobile phone and a personal digital assistant (PDA) have been widely used, and it has been demanded to further reduce the size and the weight of the electronic apparatuses and to achieve their long lives. Accordingly, as an electric power source for the electronic apparatuses, a battery, in particular, a small and light-weight secondary battery capable of providing high energy density has been developed.

In these days, it has been considered to apply such a secondary battery to various applications other than the electronic apparatuses. Examples of such applications other than the electronic apparatuses may include a battery pack attachably and detachably mounted on the electronic apparatuses or the like, an electric vehicle such as an electric automobile, an electric power storage system such as a home electric power server, and an electric power tool such as an electric drill. Further, applications other than the foregoing examples may be adopted.

Secondary batteries utilizing various charge and discharge principles to obtain a battery capacity have been proposed. In particular, a secondary battery utilizing insertion and extraction of an electrode reactant has attracted attention, since such a secondary battery provides higher energy density than a lead battery, a nickel-cadmium battery, and the like.

The secondary battery includes a cathode, an anode, and an electrolytic solution. The anode includes an active material (an anode active material) capable of inserting and extracting an electrode reactant. As the anode active material, carbon materials such as graphite have been widely used. Recently, since it has been demanded to further improve the battery capacity, using silicon has been considered. One reason for this is that, the theoretical capacity of silicon (4199 mAh/g) is significantly larger than the theoretical capacity of graphite (372 mAh/g), and therefore, the battery capacity is greatly improved thereby.

However, since silicon is intensely expanded and shrunk at the time of inserting and extracting an electrode reactant (at the time of charge and discharge), the anode active material is easily cracked mainly in the vicinity of a surface layer. In the case where the anode active material is cracked, a highly-reactive newly-formed surface (an active surface) is created, and therefore, the surface area (the reactive area) of the anode active material is increased. Thereby, a decomposition reaction of an electrolytic solution occurs on the newly-formed surface, the electrolytic solution is consumed for forming a coat derived from the electrolytic solution on the newly-formed surface, and therefore, the battery characteristics are easily lowered.

Therefore, in order to improve the battery characteristics, configurations of secondary batteries have been considered in various ways. Specifically, in order to improve cycle characteristics and the like, surfaces of particles such as silicon and silicon oxide are coated with graphite (for example, see Japanese Unexamined Patent Application Publication Nos. 2009-212074, 2011-090869, and 2011-076788). In order to improve initial efficiency and the like, a silicon-silicon oxide-lithium-based complex that is doped with lithium is used (for example, see Japanese Patent No. 4985949). In order to improve overcharge characteristics, overdischarge characteristics, and the like, a silicon oxide or a silicon salt each containing lithium is used (for example, see Japanese Patent No. 2997741).

SUMMARY

Since high performance and multi-functions of the electronic apparatuses and the like have been increasingly achieved, and frequency in use of the electronic apparatuses and the like has been increased as well, secondary batteries tend to be frequently charged and discharged. Therefore, further improvement of the battery characteristics of the secondary batteries has been desired.

It is desirable to provide an active material, an electrode, a secondary battery, a battery pack, an electric vehicle, an electric power storage system, an electric power tool, and an electronic apparatus that are capable of obtaining superior battery characteristics.

According to an embodiment of the present application, there is provided an active material including: a central section; and a covering section provided on a surface of the central section, wherein the central section includes silicon (Si) as a constituent element, the covering section includes carbon (C) and hydrogen (H) as constituent elements, and one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

According to an embodiment of the present application, there is provided an electrode including an active material, wherein the active material includes a central section and a covering section provided on a surface of the central section, the central section includes silicon (Si) as a constituent element, the covering section includes carbon (C) and hydrogen (H) as constituent elements, and one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

According to an embodiment of the present application, there is provided a secondary battery including: a cathode; an anode including an active material; and an electrolytic solution, wherein the active material includes a central section and a covering section provided on a surface of the central section, the central section includes silicon (Si) as a constituent element, the covering section includes carbon (C) and hydrogen (H) as constituent elements, and one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

According to an embodiment of the present application, there is provided a battery pack including: a secondary battery; a control section configured to control operation of the secondary battery; and a switch section configured to switch the operation of the secondary battery according to an instruction of the control section, wherein the secondary battery includes a cathode, an anode including an active material, and an electrolytic solution, the active material includes a central section and a covering section provided on a surface of the central section, the central section includes silicon (Si) as a constituent element, the covering section includes carbon (C) and hydrogen (H) as constituent elements, and one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

According to an embodiment of the present application, there is provided an electric vehicle including: a secondary battery; a conversion section configured to convert electric power supplied from the secondary battery into drive power; a drive section configured to operate according to the drive power; and a control section configured to control operation of the secondary battery, wherein the secondary battery includes a cathode, an anode including an active material, and an electrolytic solution, the active material includes a central section and a covering section provided on a surface of the central section, the central section includes silicon (Si) as a constituent element, the covering section includes carbon (C) and hydrogen (H) as constituent elements, and one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

According to an embodiment of the present application, there is provided an electric power storage system including: a secondary battery; one or more electric devices configured to be supplied with electric power from the secondary battery; and a control section configured to control the supplying of the electric power from the secondary battery to the one or more electric devices, wherein the secondary battery includes a cathode, an anode including an active material, and an electrolytic solution, the active material includes a central section and a covering section provided on a surface of the central section, the central section includes silicon (Si) as a constituent element, the covering section includes carbon (C) and hydrogen (H) as constituent elements, and one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

According to an embodiment of the present application, there is provided an electric power tool including: a secondary battery; and a movable section configured to be supplied with electric power from the secondary battery, wherein the secondary battery includes a cathode, an anode including an active material, and an electrolytic solution, the active material includes a central section and a covering section provided on a surface of the central section, the central section includes silicon (Si) as a constituent element, the covering section includes carbon (C) and hydrogen (H) as constituent elements, and one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

According to an embodiment of the present application, there is provided an electronic apparatus including a secondary battery as an electric power supply source, wherein the secondary battery includes a cathode, an anode including an active material, and an electrolytic solution, the active material includes a central section and a covering section provided on a surface of the central section, the central section includes silicon (Si) as a constituent element, the covering section includes carbon (C) and hydrogen (H) as constituent elements, and one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

As a time-of-flight secondary ion mass spectrometry (TOF-SIMS) device used for the positive ion analysis, for example, TOF-SIMS V available from ION-TOF Inc. may be used. Analysis conditions are a primary ion species of $Bi^{3+}$, an ion gun accelerating voltage of 25 kV, punching mode, an irradiation ion current of 0.3 pA (measurement at pulse mode), a mass range of 1 amu to 800 amu both inclusive, and a scanning range of 200 μm×200 μm.

According to the active material, the electrode, and the secondary battery according to the embodiments of the present application, in the active material, the central section includes silicon as a constituent element, and the covering section includes carbon and hydrogen as constituent elements. Further, one or more of positive ions represented by $C_xH_y$ (x and y satisfy $2 \leq x \leq 6$ and $3 \leq y \leq 9$) are detected by the positive ion analysis of the covering section with the use of the time-of-flight secondary ion mass spectrometry. Therefore, superior battery characteristics are obtainable. Further, according to the battery pack, the electric vehicle, the electric power storage system, the electric power tool, and the electronic apparatus according to the embodiments of the present application, similar effects are obtainable.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

An embodiment of the present application will be described below in detail with reference to the drawings. The description will be given in the following order.

1. Active Material
2. Electrode and Secondary Battery
  2-1. Square-Type
  2-2. Cylindrical-Type
  2-3. Laminated-Film-Type
3. Applications of Secondary Battery
  3-1. Battery Pack
  3-2. Electric Vehicle
  3-3. Electric Power Storage System
  3-4. Electric Power Tool

[1. Active Material]

Figure 1:
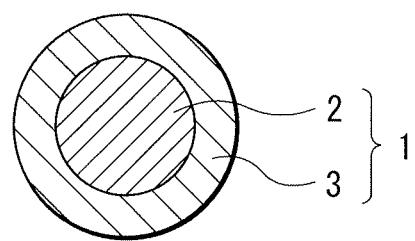
FIG. 1 is a cross-sectional view illustrating a configuration of an active material in an embodiment of the present application.
Figure 2:
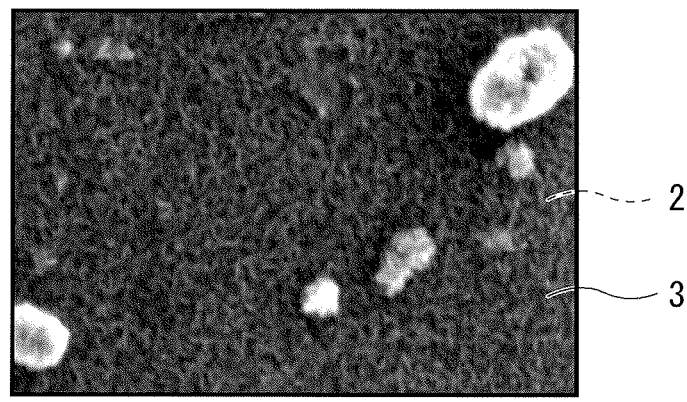
FIG. 2 is a scanning electron microscope (SEM) photograph of a surface of the active material.
Figure 3:
FIG. 3 is an SEM photograph of a surface of an active material in a comparative example.

FIG. 1 illustrates a cross-sectional configuration of an active material in an embodiment of the present application. FIG. 2 is an SEM photograph of a surface of the active material illustrated in FIG. 1. FIG. 3 is an SEM photograph of a surface of an active material in a comparative example.

The active material described here may be used for an electrode of, for example, a lithium ion secondary battery or the like. However, the active material may be used for a cathode as a cathode active material, or may be used for an anode as an anode active material.

[Configuration of Active Material]

An active material 1 as the foregoing active material includes a particulate central section 2 and a covering section 3 provided on the surface of the central section 2 as illustrated in FIG. 1.

For checking the configuration of the active material 1 in which the central section 2 is covered with the covering section 3, for example, a cross section of the active material 1 may be observed with the use of a microscope such as an SEM. Alternatively, for example, the active material 1 may be analyzed with the use of one or more of methods such as X-ray diffraction (XRD), X-ray photoelectron spectroscopy (XPS), and energy dispersive X-ray spectroscopy (EDX).

It is to be noted that, in the case where the active material 1 is mixed with other materials such as a binder and an electric conductor in an electrode, the active material 1 may be separated from such other materials with the use, for example, of a centrifugal machine or the like. Further, after a secondary battery using an electrode is completely formed, as described later, a portion of the active material 1 in a non-opposed region may be preferably observed and analyzed.

[Central Section]

The central section 2 is an inner-core portion of the active material 1, and mainly has a function to insert and extract an electrode reactant. Examples of the "electrode reactant" may include lithium (lithium ions) in the case of a lithium ion secondary battery. The central section 2 contains an active material capable of inserting and extracting the electrode reactant. The active material contains silicon (Si) as a constituent element, since silicon has high energy density, and therefore, a high battery capacity is obtainable thereby. However, the active material may contain one or more other elements as constituent elements together with silicon.

The active material is not particularly limited, as long as the active material is one or more of materials containing silicon as a constituent element. That is, the active material may be any of a simple substance, an alloy, and a compound of silicon. In the case where the active material contains silicon as a constituent element, high energy density is obtainable without depending on the type of the active material. The term "simple substance" described here merely refers to a general simple substance, and does not necessarily refer to a purity 100% simple substance. Therefore, the simple substance of silicon may contain a minute amount of impurities.

The alloys of silicon may contain, for example, one or more of elements such as tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as constituent elements other than silicon. The compounds of silicon may contain, for example, one or more of carbon, oxygen, and the like as constituent elements other than silicon. It is to be noted that, for example, the compounds of silicon may contain one or more of the elements described for the alloys of silicon as constituent elements other than silicon.

Specific examples of the alloys of silicon and the compounds of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_w$ ($0<w\leq2$), and $LiSiO$.

The active material may preferably contain oxygen (O) as a constituent element together with silicon. One reason for this is that, in this case, the irreversible capacity is decreased at the time of charge and discharge (in particular, at the time of initial charge and initial discharge), and therefore, a higher battery capacity is obtainable. Specifically, the active material may preferably contain silicon oxide represented by $SiO_w$ ($0<w\leq2$).

The composition of silicon oxide ($SiO_w$) is not particularly limited, as long as the foregoing condition ($0<w\leq2$) is satisfied. In particular, w may preferably satisfy $0.3\leq w<1.9$, since thereby, the electrode reactant is easily inserted and extracted in the central section 2.

In the central section 2 containing silicon oxide, silicon and oxygen as constituent elements of such silicon oxide may be distributed in any state. Specifically, the abundance (the atomic weight) of silicon may be constant in a direction from the surface (the uppermost surface) to the inside (the center) of the central section 2, or may be changed (increased or decreased) in such a direction. In the case where the atomic weight of silicon is changed, such an atomic weight may be continuously changed (gradually increased or decreased), or such an atomic weight may be intermittently changed (sharply increased or decreased).

On the surface of the central section 2, that is, on the interface between the central section 2 and the covering section 3, the ratio (the atomic ratio: Si/O) of the atomic weight of silicon with respect to the atomic weight of oxygen is not particularly limited. In particular, the atomic ratio may be preferably equal to or less than 75 atomic percent, and may be more preferably from 30 atomic percent to 70 atomic percent both inclusive. One reason for this is that, in this case, the electrode reactant is easily inserted and extracted in the central section 2, and electric resistance of the central section 2 is lowered.

More specifically, in the case where the atomic ratio is less than 30 atomic percent, the atomic weight of oxygen becomes excessively large with respect to the atomic weight of silicon, and therefore, the electric resistance is easily increased. In contrast, in the case where the atomic ratio is larger than 75 atomic percent (or 70 atomic percent), the atomic weight of silicon becomes excessively large with respect to the atomic weight of oxygen, and therefore, the electrode reactant is easily inserted and extracted in the central section 2 while silicon is easily degraded (surface degradation) when charge and discharge are repeated.

The atomic ratio is calculated by [atomic ratio (atomic percent)=(atomic weight of silicon/atomic weight of oxygen)×100]. For measuring the respective atomic weights of silicon and oxygen, for example, the surface of the central section 2 may be analyzed with the use of a transmission electron microscope (TEM) and an energy dispersive X-Ray analysis (EDX) device. The TEM may be, for example, JEM-2100F available from JEOL Ltd., and the EDX device may be, for example, JED-2300T available from JEOL Ltd. As measurement conditions, for example, an accelerating voltage is 200 kV, a beam current is 240 pA, a beam diameter is 0.15 mm, and analysis (cumulative) time is 30 seconds.

For checking the composition ($SiO_w$) of silicon oxide, the oxidation degree (the value of an atomic ratio w) of the central section 2 may be examined. In this case, for example, for obtaining the central section 2, the covering section 3 may be dissolved and removed with the use of an acid such as hydrogen fluoride (HF).

It is to be noted that the active material may preferably contain one or more of metal elements as constituent elements, since thereby, the electric resistance of the central section 2 is lowered. Thereby, even when the central section 2 contains highly-resistive silicon oxide, electric resistance of the whole active material 1 is kept low. In the central section 2, any of the metal elements may exist separately (in the free state) from silicon, or may form an alloy or a compound with silicon. The chemical state (such as a bonding state of metal atoms) of the central section 2 containing any of the metal elements may be checked, for example, with the use of an EDX device and/or the like.

Although types of the metal elements are not particularly limited, for example, the types of the metal elements may be preferably one or more of iron (Fe), aluminum (Al), calcium (Ca), manganese (Mn), chromium (Cr), magnesium (Mg), nickel (Ni), boron (B), titanium (Ti), vanadium (V), cobalt (Co), copper (Cu), germanium (Ge), yttrium (Y), zirconium (Zr), molybdenum (Mo), silver (Ag), indium (In), tin (Sn), antimony (Sb), tantalum (Ta), tungsten (W), lead (Pb), lanthanum (La) cesium (Ce), plutonium (Pr), neodymium (Nd), and the like. In particular, one or more of iron, aluminum, calcium, manganese, chromium, magnesium, and nickel may be preferable, since thereby, the electric resistance of the central section 2 is effectively lowered.

The crystal state of the central section 2 is not particularly limited, and may be crystalline or noncrystalline. In particular, the crystal state of the central section 2 may be preferably noncrystalline or low-crystalline. One reason for this is that, in this case, even when the active material 1 is expanded and shrunk at the time of charge and discharge, the active material 1 is less likely to be broken (for example, cracked).

Specifically, the term "low-crystalline" refers to being in a crystal state in which crystal regions (crystal grains) are scattered in noncrystalline regions. More specifically, such a term refers to being in a crystal state in which the crystal regions (the crystal grains) and the noncrystalline regions are mixed in the case where a cross section or the surface of the central section 2 are observed with the use of a high-angle annular dark-field scanning transmission electron microscopy (HAADF STEM) and/or the like. In the case where a state in which the noncrystalline regions and the crystal regions are mixed is confirmed with a TEM photograph, the crystal state of the central section 2 is low-crystalline. It is to be noted that, in the case where the noncrystalline regions and the crystal regions are mixed, the crystal regions are observed as regions (the crystal grains) each having a granular outline. In each of the crystal grains, a striped pattern (crystal lattice stripes) due to crystallinity is observed, and therefore, the crystal grains are allowed to be discriminated from the noncrystalline regions. In contrast, the term "noncrystalline" is synonymous with being a so-called amorphous state, and refers to a crystal state in which only the noncrystalline regions exist and the crystal regions do not exist in the case where the central section 2 is observed with the use of the HAADF STEM and/or the like. It is to be noted that, although the magnification ratio at the time of the observation is not particularly limited, the magnification ratio may be, for example, $1.2 \times 10^6$.

Whether the crystal state is noncrystalline or low-crystalline may be determined based on a TEM photograph. In the case where the crystal state of the central section 2 is noncrystalline, only the noncrystalline regions exist and the crystal regions (the crystal grains each having crystal lattice stripes) do not exist. In contrast, in the case where the crystal state of the central section 2 is low-crystalline, the crystal grains are scattered in the noncrystalline regions. Each of the crystal grains has crystal lattice stripes at predetermined intervals according to a lattice spacing d of silicon, and therefore, the crystal grains are clearly discriminated from the noncrystalline regions therearound.

In the case where the crystal state of the central section 2 is low-crystalline, the crystallinity degree is not particularly limited. In particular, the average area occupancy of crystal grains attributable to (111) plane and (220) plane of silicon may be preferably equal to or less than 35%, and the average grain diameter of the crystal grains may be preferably equal to or less than 30 nm. One reason for this is that, in this case, the active material 1 is less likely to be expanded and shrunk at the time of charge and discharge, and therefore, breakage is further less likely to occur.

The calculation procedure of the average area occupancy is as follows. First, a cross section of the central section 2 is observed with the use of the HAADF STEM to obtain a TEM photograph. In this example, the observation magnification ratio is $1.2 \times 10^6$, and the observation area is 65.6 nm×65.7 nm. Subsequently, presence or absence of crystal lattice stripes, a value of the lattice spacing d, and the like are examined to identify regions where the crystal grains attributable to the (111) plane and the crystal grains attributable to the (220) plane of silicon exist. Thereafter, the outlines of the crystal grains are portrayed in the TEM photograph. The crystal grains attributable to the (111) plane refer to crystal regions each having crystal lattice stripes with the lattice spacing d of 0.31 nm, and the crystal grains attributable to the (220) plane refer to crystal regions each having crystal lattice stripes with the lattice spacing d of 0.19 nm. Subsequently, after each area of each crystal grain is calculated, [area occupancy (%)=(sum of areas of crystal grains/observation area)×100] is calculated. The portraying of the outlines of the crystal grains and the calculation of the area occupancy may be performed manually, or may be performed automatically with the use of exclusive processing software and/or the like. Finally, the calculation operation of the area occupancy is repeated for 40 areas, and thereafter, the average value (the average area occupancy) of the area occupancy each calculated in each area is calculated.

The calculation procedure of the average grain diameter of the crystal grains is similar to that in the case of calculating the average area occupancy, except that after each average grain diameter is measured for each area, the average value (the final average grain diameter) of the measured average grain diameters is calculated. It is to be noted that, in the case where a grain diameter of a crystal grain is measured, for example, after the outline of the crystal grain is converted to a circle (a circle having an area equal to that of the shape defined by the outline of the crystal grain is identified), the diameter of the circle is regarded as the grain diameter. The calculation of the average grain diameter may be performed manually or automatically as in the calculation of the average area occupancy.

Although the average grain diameter (a median diameter D50) of the central section 2 is not particularly limited, in particular, the average grain diameter thereof may be preferably from 0.1 μm to 20 μm both inclusive. One reason for this is that, in this case, the active material 1 is further less likely to be broken at the time of charge and discharge, and high safety is obtained. More specifically, in the case where D50 is less than 0.1 μm, due to excessive increase of the surface area (the reaction area) of the central section 2, a decomposition reaction of an electrolytic solution and the like are promoted, and therefore, safety is easily lowered. In contrast, in the case where D50 is larger than 20 μm, the active material 1 is easily broken due to expansion at the time of charge, and coating of slurry containing the active material 1 becomes difficult in a step of fabricating the electrode.

Upon examining the average grain diameter of the central section 2, the average grain diameter of the central section 2 itself may be measured, or the average grain diameter of the central section 2 may be calculated with the use of the active material 1. In the case of using the active material 1, for example, the average grain diameter (the median diameter D50) of the active material 1 is obtained by laser analysis (diffraction), and thereafter, a value obtained by subtracting the average thickness of the after-described covering section 3 from such an average grain diameter of the active material 1 is found, and the found value may be regarded as the average grain diameter of the central section 2. It is to be noted that in the case where the average thickness of the covering section 3 is significantly small, specifically, is equal to or less than 200 nm, the average grain diameter of the active material 1 obtained by the laser analysis may be regarded as a value substantially corresponding with the average grain diameter of the central section 2.

It is to be noted that, in the central section 2, part or all of silicon as a constituent element may be preferably alloyed with an electrode reactant in an uncharged state. In other words, in the central section 2 in the uncharged state, the electrode reactant may be preferably inserted (a so-called pre-doping) into the central section 2 preliminarily. One reason for this is that, in this case, the irreversible capacity is decreased at the time of initial charge and initial discharge, and therefore, a higher battery capacity is obtainable. Whether or not the central section 2 is pre-doped may be preferably determined by examining a portion of the active material 1 in the non-opposed region in the completely formed secondary battery as described later.

In particular, in the case where the active material 1 is used for a lithium ion secondary battery, the central section 2 may preferably contain lithium silicate. One reason for this is that, in this case, the central section 2 is in a pre-doped state, and therefore, the irreversible capacity is decreased as described above.

[Covering Section]

The covering section 3 is an outer-core portion of the active material 1, and mainly has a function to physically and chemically protect the central section 2. The covering section 3 contains an electrically-conductive material, and the electrically-conductive material contains carbon (C) and hydrogen (H) as constituent elements. One reason why the covering section 3 contains carbon as a constituent element is that, in this case, high electric conductivity is obtained, and therefore, electric resistance of the whole active material 1 is lowered. Thereby, even when the central section 2 contains highly-resistive silicon oxide, the electric resistance of the whole active material 1 is kept low. However, the covering section 3 may contain one or more other elements as constituent elements together with carbon and hydrogen.

It is to be noted that the covering section 3 may be provided on part or all of the surface of the central section 2. That is, the covering section 3 may cover only part of the surface of the central section 2, or may cover the whole surface of the central section 2. In the former case, the covering section 3 may exist in a plurality of places on the surface of the central section 2. Further, the covering section 3 may have a single-layer structure or a multi-layer structure.

As described above, since the covering section 3 contains carbon and hydrogen as constituent elements, the covering section 3 contains hydrocarbon component together with carbon component and hydrogen component. The composition of the hydrocarbon component (the bonding state of carbon and hydrogen) contained in the covering section 3 is set appropriate in relation to reactivity of the covering section 3.

More specifically, by performing positive ion analysis of the covering section 3 with the use of time-of-flight secondary ion mass spectrometry (TOF-SIMS), one or more of positive ions represented by $C_xH_y$ (x and y satisfy $2 \leq x \leq 6$ and $3 \leq y \leq 9$) are detected. One reason why the foregoing positive ions are detected by the positive ion analysis of the covering section 3 is that, in this case, reactivity on the surface of the covering section 3 is decreased. Thereby, a decomposition reaction of the electrolytic solution is suppressed, and an irreversible reaction (a side reaction) inhibiting insertion and extraction of the electrode reactant is also suppressed. It is to be noted that, in the case where the foregoing value x is larger than 6, the covering section 3 becomes chemically unstable, and therefore, adhesibility of the covering section 3 with respect to the central section 2 is significantly decreased.

In the following description, positive ions satisfying the foregoing composition conditions will be referred to as "specific ions," and positive ions not satisfying such conditions will be referred to as "other ions" respectively.

Types of the specific ions are not particularly limited as long as the foregoing composition conditions are satisfied. For example, the types of the specific ions may be one or more of $C_2H_3$, $C_2H_4$, $C_2H_5$, $C_3H_5$, $C_3H_7$, $C_4H_8$, $C_4H_9$, $C_5H_7$, and $C_6H_5$. However, the foregoing types of the specific ions are merely examples, which are some of positive ions each having comparatively high detected intensity. Therefore, as long as the foregoing composition conditions are satisfied, positive ions other than the above-described positive ions may be adopted. In contrast, examples of other ions may include one or more of C, $CH_2$, and $CH_3$.

As a TOF-SIMS device used for the positive ion analysis, for example, TOF-SIMS V available from ION-TOF Inc. may be used. Analysis conditions are a primary ion species of $Bi^{3+}$, an ion gun accelerating voltage of 25 kV, punching mode, an irradiation ion current of 0.3 pA (measurement at pulse mode), a mass range of 1 amu to 800 amu both inclusive, and a scanning range of 200 μm×200 μm.

For examining whether or not a specific ion is detected, for example, a TOF-SIMS spectrum (the horizontal axis: mass, the vertical axis: intensity) including peaks attributable to a plurality of positive ions may be obtained. By identifying types of the positive ions from detection positions (masses) of the respective peaks, whether or not a specific ion is detected may be determined.

As long as a specific ion is detected by the positive ion analysis of the covering section 3, the detected intensity of the specific ion is not particularly limited. In particular, of the specific ions, a ratio D1/D2 between a sum D1 of the detected intensities of positive ions represented by $C_2H_3$, $C_2H_5$, and $C_3H_5$ and a detected intensity D2 of C (x=1 and y=0 in $C_xH_y$) may be preferably equal to or larger than 1.25, and may be more preferably equal to or larger than 50. Further, a ratio D1/D3 between the sum D1 of the detected intensities of the positive ions represented by $C_2H_3$, $C_2H_5$, and $C_3H_5$ and a sum D3 of the detected intensities of positive ions represented by $CH_z$ (z satisfies 0≤z≤3) may be preferably larger than 1. In either case, reactivity on the surface of the covering section 3 is further decreased. In particular, in the case where the ratio D1/D2 becomes equal to or larger than 50, mixture state (such as dispersibility of the active material 1) of after-described slurry containing the active material 1 becomes favorable, and therefore, the coating surface becomes smooth and the coating thickness becomes uniform. It is to be noted that types of the positive ions represented by $CH_z$ (z satisfies 0≤z≤3) may be one or more of C, CH, $CH_2$, and $CH_3$.

The surface of the covering section 3 in which a specific ion is detected by TOF-SIMS has distinguishing characteristics. Specifically, on the surface of the covering section 3 in which the specific ion is detected, as illustrated in FIG. 2, a minute concavo-convex structure attributable to the specific ion is formed. In this case, adhesibility of a binder and/or the like with respect to the active material 1 is improved, and therefore, the active material 1 is less likely to be peeled off from the binder and/or the like. Accordingly, as described later, upon spirally winding an electrode containing a binder and/or the like together with the active material 1, the electrode is less likely to be disrupted, and so-called electrode winding characteristics are improved thereby. In contrast, on the surface of the covering section 3 in which a specific ion is not detected, as illustrated in FIG. 3, a minute concavo-convex structure attributable to the specific ion is not formed, and therefore, the surface becomes substantially flat.

Although the average thickness of the covering section 3 is not particularly limited, in particular, the average thickness thereof may be small as much as possible, and specifically, may be preferably equal to or less than 500 nm. One reason for this is that, in this case, the electrode reactant is easily inserted and extracted in the central section 2. However, the average thickness of the covering section 3 may be preferably equal to or larger than 20 nm. One reason for this is that, in the case where the covering section 3 is excessively thin, the active material 1 is easily cracked at the time of charge and discharge.

The average thickness of the covering section 3 is calculated by the following procedure. First, one piece of the active material 1 is observed with the use of an SEM or the like. The magnification ratio at the time of the observation may be preferably a magnification ratio at which the interface between the central section 2 and the covering section 3 is allowed to be checked (determined) visually in order to measure the thickness of the covering section 3. Subsequently, after thicknesses of the covering section 3 at arbitrary ten locations are measured, the average value thereof (an average thickness T per one piece of the active material 1) is calculated. In this case, the measurement locations may be preferably set not to be concentrated around a certain place but to be dispersed widely as much as possible. Subsequently, the foregoing operation of calculating an average value is repeated until the total number of observed pieces of the active material 1 by the SEM reaches 100. Finally, the average value (the average value of respective average thicknesses) of the average values (the average thicknesses per each one piece of the active material 1) calculated for 100 pieces of the active materials 1 is calculated, and the resultant value is regarded as the average thickness of the covering section 3.

Though the average coverage ratio of the covering section 3 with respect to the central section 2 is not specifically limited, in particular, the average coverage ratio thereof may be preferably large as much as possible, and specifically, may be preferably equal to or larger than 30% (from 30% to 100% both inclusive). One reason for this is that, in this case, reactivity on the surface of the covering section 3 is effectively decreased.

The average coverage ratio of the covering section 3 is calculated by the following procedure. First, as in the case of calculating the average thickness, one piece of the active material 1 is observed with the use of an SEM or the like. The magnification ratio at the time of the observation may be preferably a magnification ratio at which, in the central section 2, a portion covered with the covering section 3 and a portion not covered with the covering section 3 are allowed to be identified visually. Subsequently, in the outer edge (the outline) of the central section 2, the length of the portion covered with the covering section 3 and the length of the portion not covered with the covering section 3 are measured. Thereafter, [the coverage ratio (the coverage ratio per one piece of the active material 1:%)=(the length of the portion covered with the covering section 3/the length of the outer edge of the central section 2)×100] is calculated. Subsequently, the foregoing operation of calculating the coverage rate is repeated until the total number of observed pieces by the SEM reaches 100. Finally, the average value of the coverage ratios (the coverage ratios per each one piece of the active material 1) calculated for 100 pieces of the active materials 1 is calculated, and the calculated value is regarded as the average coverage ratio of the covering section 3.

Generally, when a carbon material is analyzed by Raman spectrum method, in the analytical result (a Raman spectrum), a G band peak attributable to a graphite structure is detected in the vicinity of 1590 $cm^{-1}$, and a D band peak attributable to a defect is detected in the vicinity of 1350 $cm^{-1}$. A ratio IG/ID between an intensity IG of the G band peak and an intensity ID of the D band peak is also called a G/D ratio, and is an index indicating a crystal state (purity) of carbon materials.

Although the ratio IG/ID of the covering section 3 containing carbon as a constituent element is not particularly limited, in particular, the ratio IG/ID may be preferably from 0.3 to 3 both inclusive, and may be more preferably around 2. One reason for this is that, in this case, superior binding characteristics, superior electric conductivity, and superior deformation characteristics are obtainable.

More specifically, in the case where the ratio IG/ID is smaller than 0.3, the binding characteristics are increased, and therefore, adhesibility between each piece of the coverage section 3 and adhesibility of the coverage section 3 with respect to the central section 2 are improved. However, in this case, the electric conductivity is lowered, and the covering section 3 becomes rigid, and therefore, in association with expansion and shrinkage of the active material 1, the covering section 3 may be less likely to be expanded and shrunk, and there is a possibility that superior electric conductivity is not obtainable. In contrast, in the case where the ratio IG/ID is larger than 3, the electric conductivity is increased, and the covering section 3 is softened, and therefore, in association with expansion and shrinkage of the active material 1, the covering section 3 is easily expanded and shrunk, and sufficient electric conductivity is obtained. However, in this case, the binding characteristics are lowered, and therefore, there is a possibility that adhesibility between each covering section 3 and adhesibility of the covering section 3 with respect to the central section 2 be lowered. In contrast, in the case where the ratio IG/ID is from 0.3 to 3 both inclusive, the binding characteristics and the electric conductivity of the coverage section 3 are increased, and in association with expansion and shrinkage of the active material 1, the covering section 3 is easily expanded and shrunk.

Upon using the Raman spectrum method, for example, an analytical subject may be irradiated with laser light (wavelength: 523 nm) so that the irradiation intensity on the analytical subject becomes 0.3 mW, and a Raman spectral device having a wavenumber resolution of 4 $cm^{-1}$ is used.

[Method of Manufacturing Active Material]

The active material 1 is manufactured, for example, by the following procedure.

First, the central section 2 capable of inserting and extracting an electrode reactant is prepared. The formation material (the active material) of the central section 2 is not particularly limited as long as the material is a granular (powdery) material containing silicon as a constituent element. Further, although the formation method of the central section 2 is not particularly limited, for example, one or more of a gas atomization method, a water atomization method, a fusion pulverization method, and the like may be used. In this case, by changing conditions such as formation temperature of the central section 2, the crystal state of the central section 2 is allowed to be controlled. It is to be noted that, a metal element such as iron may be contained in the central section 2 together with silicon by fusing a metal material together with the active material.

Upon forming the central section 2 containing silicon oxide, silicon oxide may be obtained, for example, by one or more of a gas atomization method, a water atomization method, a fusion pulverization method, and the like. In this case, the composition (the oxidation degree) of silicon oxide is controllable by introducing gas such as hydrogen ($H_2$) and oxygen ($O_2$) and adjusting conditions such as an introduction amount of the gas. Thereafter, the surface of such silicon oxide may be reduced by heating the silicon oxide. In this case, the atomic ratio (Si/O) on the surface of the central section 2 is controllable by gas such as hydrogen or by changing conditions such as pressure, heating temperature, and an introduction amount of gas.

Subsequently, the covering section 3 is formed on the surface of the central section 2. The formation method of the covering section 3 may be, for example, a vapor-phase deposition method. The vapor-phase deposition method may be, for example, one or more of an evaporation method, a sputtering method, a CVD method, and the like. In particular, a thermal decomposition CVD method may be preferable, since thereby, types of positive ions detected by TOF-SIMS and the like are easily controlled. Upon forming the covering section 3, types of positive ions and the like are controllable by adjusting conditions such as a formation method, carbon source gas (a type and an introduction amount) used for a thermal decomposition reaction, thermal decomposition temperature, and auxiliary gas (a type and an introduction amount). The carbon source gas may be, for example, one or more of carbon hydride such as methane gas ($CH_3$) and acetylene ($C_2H_2$). The auxiliary gas may be, for example, one or more of hydrogen and argon (Ar).

Thereby, the covering section 3 is provided on the surface of the central section 2, and a specific ion is detected by the positive ion analysis of the covering section 3 with the use of TOF-SIMS, and therefore, the active material 1 is completed.

It is to be noted that although the method of pre-doping to the active material 1 is not particularly limited, for example, a powder mixing method, an evaporation method, or the like may be used. In the powder mixing method, for example, the active material 1 and lithium metal powder are mixed, and thereafter, the mixture is heated under an inert atmosphere. In the evaporation method, for example, an electrode containing the active material 1 is fabricated, and thereafter, an evaporation process is performed on the electrode with the use of lithium metal as an evaporation source.

[Function and Effect of Active Material]

According to the active material 1, the covering section 3 containing carbon and hydrogen as constituent elements is provided on the surface of the central section 2 containing silicon as a constituent element. Further, a specific ion is detected by the positive ion analysis of the covering section 3 with the use of TOF-SIMS. In this case, as described above, the electric resistance of the whole active material 1 is lowered. Further, since the reactivity on the surface of the covering section 3 is decreased, a decomposition reaction of the electrolytic solution is suppressed, and an irreversible reaction (a side reaction) inhibiting insertion and extraction of the electrode reactant is also suppressed. Therefore, battery characteristics of secondary batteries using the active material 1 are allowed to be improved.

In particular, in the case where the ratio D1/D2 between the sum D1 of the detected intensities of the specific ions ($C_2H_3$, $C_2H_5$, and $C_3H_5$) and the detected intensity D2 of other ion (C) is equal to or larger than 1.25, higher effects are obtainable. Further, in the case where the ratio D1/D3 between the sum D1 of the detected intensities of the specific ions ($C_2H_3$, $C_2H_5$, and $C_3H_5$) and the sum D3 of the detected intensities of other ions ($CH_z$ (z satisfies $0 \leq z \leq 3$)) is larger than 1, higher effects are obtainable.

[2. Electrode and Secondary Battery]

Next, description will be given of application examples of the foregoing active material. The active material is used for an electrode and a secondary battery as follows.

[2-1. Square-Type]

Figure 4:
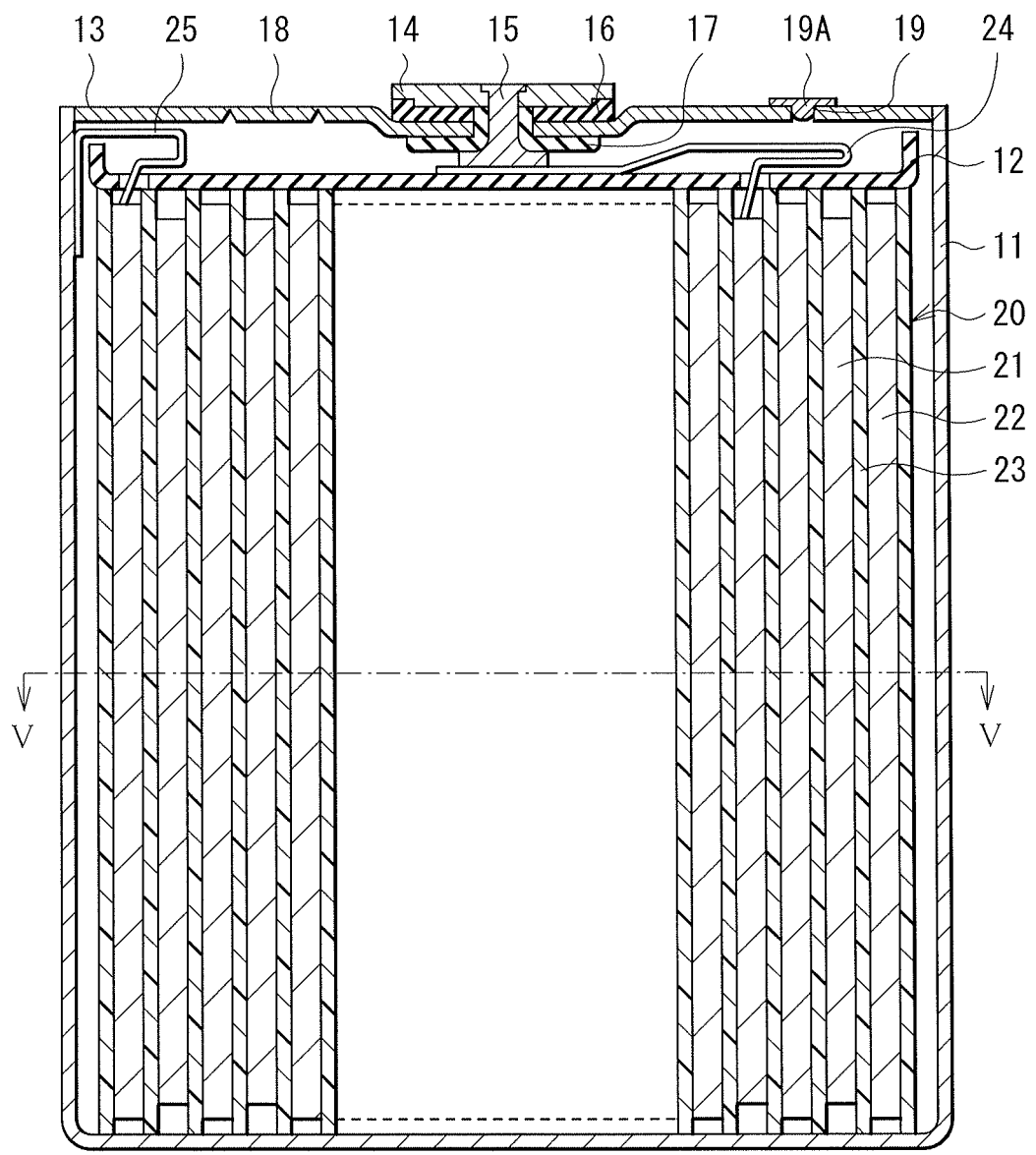
FIG. 4 is a cross-sectional view illustrating a configuration of a secondary battery (square-type) using an electrode in the embodiment of the present application.
Figure 5:
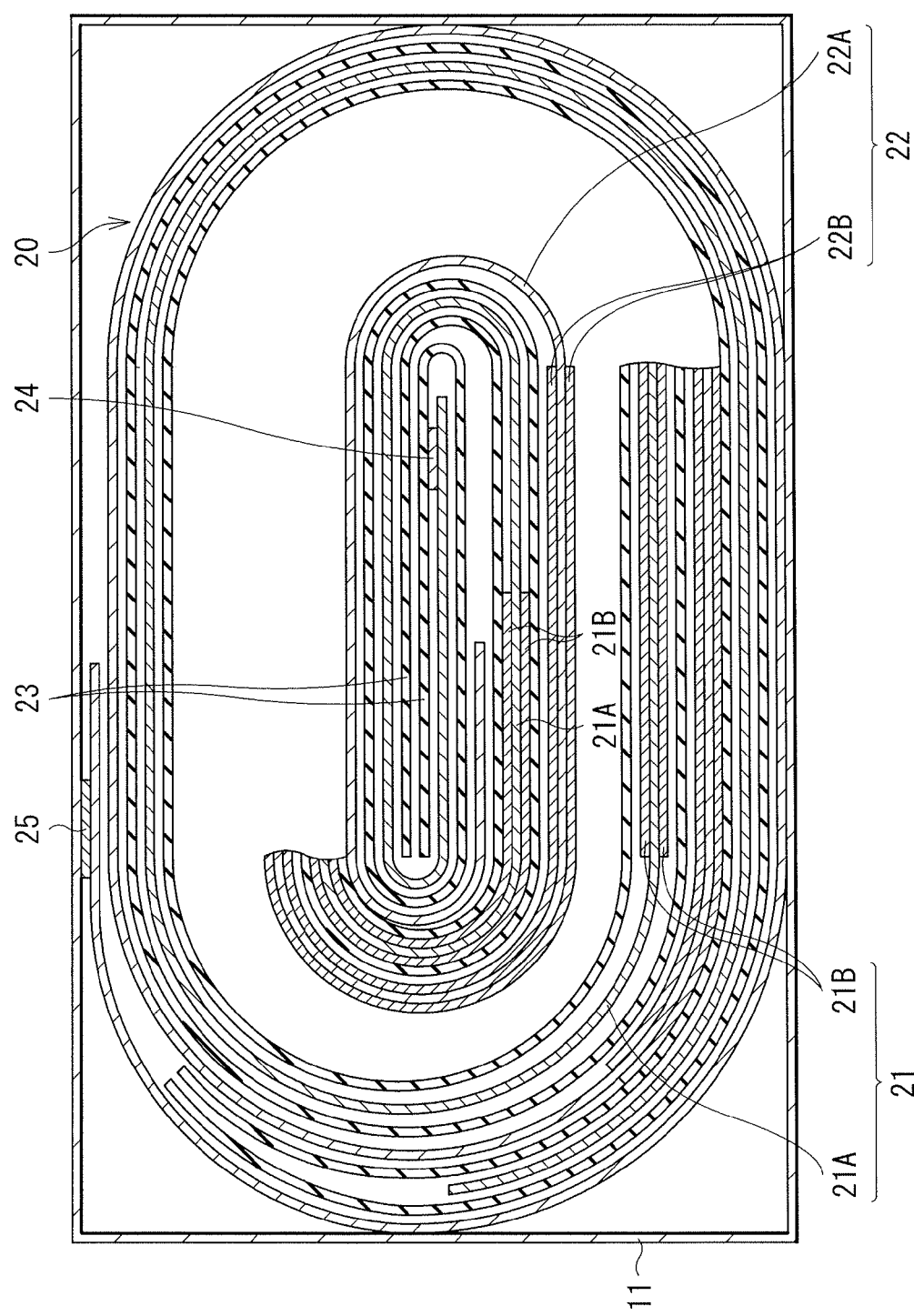
FIG. 5 is a cross-sectional view taken along a line V-V of the secondary battery illustrated in FIG. 4.
Figure 6:
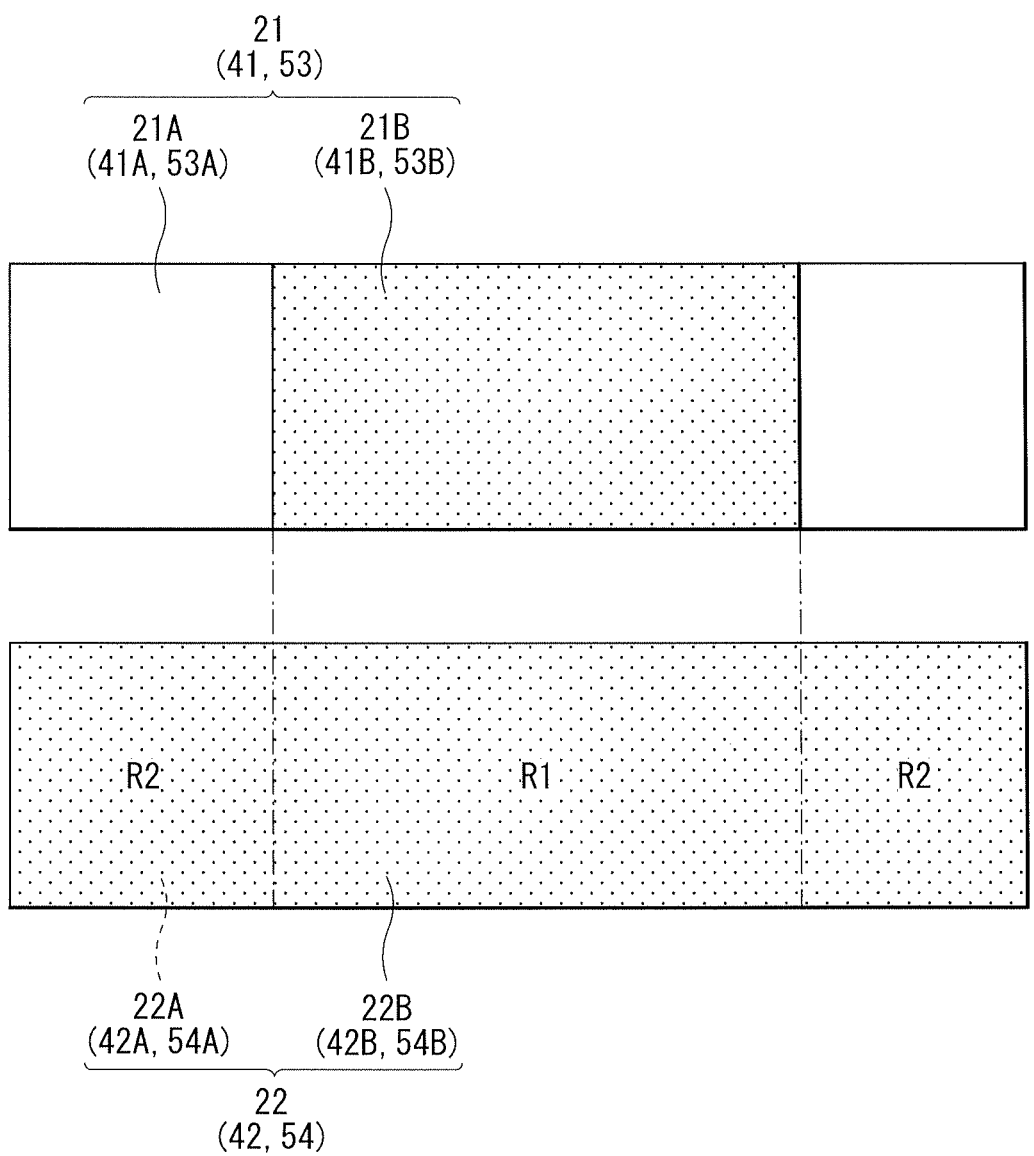
FIG. 6 is a plan view schematically illustrating configurations of a cathode and an anode illustrated in FIG. 5.

FIG. 4 and FIG. 5 illustrate cross-sectional configurations of a square-type secondary battery. FIG. 5 illustrates a cross section taken along a line V-V of the secondary battery illustrated in FIG. 4. FIG. 6 schematically illustrates planar configurations of a cathode 21 and an anode 22 illustrated in FIG. 5.

[Whole Configuration of Secondary Battery]

The secondary battery described here is a lithium ion secondary battery in which the capacity of the anode 22 is obtained by insertion and extraction of lithium (lithium ions) as an electrode reactant, and has a so-called square-type battery structure. In this example, the electrode is applied to the anode 22.

The secondary battery may contain, for example, a battery element 20 inside a battery can 11. The battery element 20 may be formed by, for example, laminating the cathode 21 and the anode 22 with a separator 23 in between, and subsequently spirally winding the resultant laminated body. The battery element 20 has a flat shape correspondingly to the shape of the battery can 11.

The battery can 11 may be, for example, a square package member. As illustrated in FIG. 5, the square package member has a shape in which a cross section in a longitudinal direction is rectangular or substantially rectangular (including a curved line partly), and is applied not only to a square-type battery in the shape of a rectangle but also to a square-type battery in the shape of an oval. That is, the square package member is a serving-dish-like member in the shape of a rectangle with a base or in the shape of an oval with a base, which has a rectangular opening or an opening having a substantially rectangular shape (an oval shape) obtained by connecting arcs by straight lines. It is to be noted that FIG. 5 illustrates a case in which the battery can 11 has a rectangular cross-sectional shape.

The battery can 11 may be made, for example, of one or more of iron, aluminum, alloys thereof, and the like, and may also have a function as an electrode terminal. In particular, in order to utilize rigidity (difficulty in deformation) to suppress swollenness of the battery can 11 at the time of charge and discharge, iron that is more rigid than aluminum may be preferable. It is to be noted that, in the case where the battery can 11 is made of iron, the surface of the battery can 11 may be plated with nickel or the like.

Further, the battery can 11 may have, for example, a hollow structure in which one end of the battery can 11 is opened and the other end of the battery can 11 is closed. The battery can 11 is hermetically sealed by an insulating plate 12 and a battery cover 13 that are attached to the open end. The insulating plate 12 is provided between the battery element 20 and the battery cover 13, and may be made, for example, of an insulating material such as polypropylene. The battery cover 13 may be made, for example, of a material similar to that of the battery can 11, and may serve as an electrode terminal as the battery can 11.

Outside the battery cover 13, a terminal plate 14 as a cathode terminal is provided. The terminal plate 14 is electrically insulated from the battery cover 13 with an insulating case 16 in between. The insulating case 16 may be made, for example, of an insulating material such as polyethylene terephthalate. In the substantial center of the battery cover 13, a through-hole is provided. A cathode pin 15 is inserted into the through-hole so that the cathode pin 15 is electrically connected to the terminal plate 14 and is electrically insulated from the battery cover 13 with a gasket 17 in between. The gasket 17 may be made, for example, of an insulating material. The surface of the gasket 17 may be coated with asphalt.

In the periphery of the battery cover 13, a cleavage valve 18 and an injection hole 19 are provided. The cleavage valve 18 is electrically connected to the battery cover 13. In the case where the internal pressure of the battery becomes a certain level or more by internal short circuit, external heating, or the like, the cleavage valve 18 is separated from the battery cover 13 to release the internal pressure. The injection hole 19 may be sealed, for example, by a sealing member 19A such as a stainless corundum.

A cathode lead 24 made of an electrically-conductive material such as aluminum may be attached to an end (such as the internal end) of the cathode 21. An anode lead 25 made of an electrically-conductive material such as nickel may be attached to an end (such as the outer end) of the anode 22. The cathode lead 24 may be welded to one end of the cathode pin 15, and may be electrically connected to the terminal plate 14. The anode lead 25 may be welded to the battery can 11, and may be electrically connected to the battery can 11.

[Cathode]

The cathode 21 has a cathode active material layer 21B on a single surface or both surfaces of a cathode current collector 21A. The cathode current collector 21A may be made, for example, of an electrically-conductive material such as aluminum, nickel, and stainless steel.

The cathode active material layer 21B contains, as cathode active materials, one or more of cathode materials capable of inserting and extracting lithium ions. The cathode active material layer 21B may further contain one or more of other materials such as a cathode binder and a cathode electric conductor.

The cathode material may be preferably a lithium-containing compound, since thereby, high energy density is obtained. Examples of the lithium-containing compound may include a lithium-transition-metal composite oxide and a lithium-transition-metal-phosphate compound. The lithium-transition-metal composite oxide is an oxide containing lithium (Li) and one or more transition metal elements as constituent elements. The lithium-transition-metal-phosphate compound is a phosphate compound containing lithium and one or more transition metal elements as constituent elements. In particular, it may be preferable that the transition metal element be one or more of cobalt (Co), nickel (Ni), manganese (Mn), iron (Fe), and the like, since a higher voltage is obtained thereby. The chemical formula of the lithium-transition-metal composite oxide may be expressed by, for example, $Li_xM1O_2$, and the chemical formula of the lithium-transition-metal-phosphate compound may be expressed by, for example, $Li_yM2PO_4$. In the formulas, M1 and M2 represent one or more transition metal elements. Values of x and y vary according to the charge and discharge state, and may be, for example, in the range of $0.05 \leq x \leq 1.10$ and $0.05 \leq y \leq 1.10$.

Specific examples of the lithium-transition-metal composite oxide may include $LiCoO_2$, $LiNiO_2$, and a lithium-nickel-based composite oxide represented by the following Formula (1). Specific examples of the lithium-transition-metal-phosphate compound may include $LiFePO_4$ and LiFe$_{1-u}$Mn$_u$PO$_4$ (u<1), since thereby, a high battery capacity is obtained and superior cycle characteristics and the like are obtained as well.

$$\text{LiNi}_{1-z}\text{M}_z\text{O}_2 \quad (1)$$

In Formula (1), M is one or more of cobalt (Co), manganese (Mn), iron (Fe), aluminum (Al), vanadium (V), tin (Sn), magnesium (Mg), titanium (Ti), strontium (Sr), calcium (Ca), zirconium (Zr), molybdenum (Mo), technetium (Tc), ruthenium (Ru), tantalum (Ta), tungsten (W), rhenium (Re), ytterbium (Yb), copper (Cu), zinc (Zn), barium (Ba), boron (B), chromium (Cr), silicon (Si), gallium (Ga), phosphorus (P), antimony (Sb), and niobium (Nb); and z satisfies 0.005<z<0.5.

In addition thereto, the cathode material may be, for example, one or more of an oxide, a disulfide, a chalcogenide, an electrically-conductive polymer, and the like. Examples of the oxide may include titanium oxide, vanadium oxide, and manganese dioxide. Examples of the disulfide may include titanium disulfide and molybdenum sulfide. Examples of the chalcogenide may include niobium selenide. Examples of the electrically-conductive polymer may include sulfur, polyaniline, and polythiophene. However, the cathode material is not limited to one of the foregoing materials, and may be other material.

Examples of the cathode binder may include one or more of synthetic rubbers, polymer materials, and the like. Examples of the synthetic rubber may include a styrene-butadiene-based rubber, a fluorine-based rubber, and ethylene propylene diene. Examples of the polymer material may include polyvinylidene fluoride and polyimide.

Examples of the cathode electric conductor may include one or more of carbon materials and the like. Examples of the carbon materials may include graphite, carbon black, acetylene black, and Ketjen black. It is to be noted that the cathode electric conductor may be other material such as a metal material and an electrically-conductive polymer as long as the material has electric conductivity.

[Anode]

The anode 22 has an anode active material layer 22B on a single surface or both surfaces of an anode current collector 22A.

The anode current collector 22A may be made, for example, of an electrically-conductive material such as copper, nickel, and stainless steel.

In the case where the anode current collector 22A contains copper as a constituent element, the anode current collector 22A may preferably further contain carbon (C) and sulfur (S) as constituent elements. One reason for this is that, in this case, the physical strength (durability) of the anode current collector 22A is improved, and therefore, the anode current collector 22A is less likely to be deformed or broken (for example, fractured) even when the anode active material layer 22B is expanded and shrunk at the time of charge and discharge. Specifically, the anode current collector 22A may be, for example, a copper foil doped with carbon and ions. Although the sum of the respective contents of carbon and sulfur in the anode current collector 22A is not particularly limited, in particular, the sum thereof may be preferably equal to or less than 100 ppm, since thereby, a higher effect is obtained.

Although the average grain diameter of copper crystallite is not particularly limited, in particular, the average grain diameter thereof may be preferably from 0.01 μm to 5 μm both inclusive, since thereby, a higher effect is obtained. The calculation procedure of the average grain diameter of the copper crystallite may be, for example, similar to the calculation procedure of the average grain diameter of the crystal grains described above.

The surface of the anode current collector 22A may be preferably roughened. Thereby, due to a so-called anchor effect, adhesibility of the anode active material layer 22B with respect to the anode current collector 22A is improved. In this case, it is enough that the surface of the anode current collector 22A in a region opposed to the anode active material layer 22B is roughened at minimum. Examples of roughening methods may include a method of forming fine particles by utilizing electrolytic treatment. The electrolytic treatment is a method of providing concavity and convexity on the surface of the anode current collector 22A by forming fine particles on the surface of the anode current collector 22A with the use of an electrolytic method in an electrolytic bath. A copper foil fabricated by an electrolytic method is generally called "electrolytic copper foil."

The anode active material layer 22B contains one or more of anode materials capable of inserting and extracting lithium ions as anode active materials, and the anode materials contain the foregoing active material. However, the anode active material layer 22B may further contain one or more of other materials such as an anode binder and an anode electric conductor. Details of the anode binder and the anode electric conductor may be, for example, similar to those of the cathode binder and the cathode electric conductor.

The chargeable capacity of the anode material may be preferably larger than the discharging capacity of the cathode 21 in order to prevent lithium metal from being unintentionally precipitated on the anode 22 in the middle of charge. That is, the electrochemical equivalent of the anode material capable of inserting and extracting lithium ions may be preferably larger than the electrochemical equivalent of the cathode 21.

It is to be noted that, the anode active material layer 22B may further contain other anode materials as long as the anode active material layer 22B contains the foregoing active material as an anode material. Examples of such other materials may include, for example, one or more of carbon materials. In the carbon materials, crystal structure change at the time of insertion and extraction of lithium ions is extremely small. Therefore, the carbon materials provide high energy density and superior cycle characteristics. Further, the carbon materials serve as anode electric conductors as well. Examples of the carbon materials may include graphitizable carbon, non-graphitizable carbon, and graphite. The spacing of (002) plane of the non-graphitizable carbon may be preferably equal to or greater than 0.37 nm, and the spacing of (002) plane of the graphite may be preferably equal to or smaller than 0.34 nm. More specifically, examples of the carbon materials may include pyrolytic carbons, cokes, glassy carbon fiber, an organic polymer compound fired body, activated carbon, and carbon blacks. Examples of the cokes may include pitch coke, needle coke, and petroleum coke. The organic polymer compound fired body is obtained by firing (carbonizing) a polymer compound such as a phenol resin and a furan resin at appropriate temperature. In addition thereto, examples of the carbon materials may include low crystalline carbon and amorphous carbon that are heat-treated at temperature equal to or less than about 1000 deg C. It is to be noted that the shape of any of the carbon materials may be any of a fibrous shape, a spherical shape, a granular shape, and a scale-like shape.

Further, examples of other anode materials may include a metal-based material (excluding materials containing silicon as a constituent element) containing one or more of metal elements and metalloid elements as constituent elements, since higher energy density is thereby obtained. Such a metal-based material may be any of a simple substance, an alloy, and a compound, may be two or more thereof, or may be a material having one or more phases thereof in part or all thereof. It is to be noted that "alloy" includes a material containing one or more metal elements and one or more metalloid elements, in addition to a material configured of two or more metal elements. Further, the "alloy" may contain a non-metallic element. Examples of the structure thereof may include a solid solution, a eutectic crystal (eutectic mixture), an intermetallic compound, and a structure in which two or more thereof coexist.

Examples of the foregoing metal elements and the foregoing metalloid elements may include one or more of metal elements and metalloid elements that are capable of forming an alloy with lithium. Specific examples thereof may include Mg, B, Al, Ga, In, Ge, Sn, Pb, Bi, Cd, Ag, Zn, Hf, Zr, Y, Pd, and Pt. In particular, tin (Sn) may be preferable, since tin has a superior ability of inserting and extracting lithium ions, and therefore, provides high energy density.

A material containing tin as a constituent element may be any of a simple substance, an alloy, and a compound of tin, may be two or more thereof, or may be a material having one or more phases thereof in part or all thereof. It is to be noted that, the term "simple substance" merely refers to a general simple substance (that may contain a small amount of impurity), and does not necessarily refer to a purity 100% simple substance.

The alloys of tin may contain, for example, one or more of elements such as nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as constituent elements other than tin. The compounds of tin may contain, for example, one or more of carbon, oxygen, and the like as constituent elements other than tin. It is to be noted that, for example, the compounds of tin may contain one or more of the elements described for the alloys of tin as constituent elements other than tin. Specific examples of the alloys of tin and the compounds of tin may include $SnO_v$ ($0<v\leq2$), $SnSiO_3$, $LiSnO$, and $Mg_2Sn$.

In particular, as a material containing tin as a constituent element, for example, a material containing a second constituent element and a third constituent element in addition to tin as a first constituent element may be preferable. Examples of the second constituent element may include one or more of elements such as Co, Fe, Mg, Ti, V, Cr, Mn, Ni, Cu, Zn, Ga, Zr, Nb, Mo, Ag, In, Ce, Hf, Ta, W, Bi, and Si. Examples of the third constituent element may include one or more of B, C, Al, P, and the like. In the case where the second constituent element and the third constituent element are contained, a high battery capacity, superior cycle characteristics, and the like are obtained.

In particular, a material (an SnCoC-containing material) containing tin, cobalt, and carbon as constituent elements may be preferable. In the SnCoC-containing material, for example, the carbon content may be from 9.9 mass % to 29.7 mass % both inclusive, and the ratio (Co/(Sn+Co)) of tin and cobalt contents may be from 20 mass % to 70 mass % both inclusive, since high energy density is obtained thereby.

It may be preferable that the SnCoC-containing material have a phase containing tin, cobalt, and carbon. Such a phase may be preferably low-crystalline or amorphous. The phase is a reaction phase capable of reacting with lithium. Therefore, due to existence of the reaction phase, superior characteristics are obtained. The half bandwidth of the diffraction peak obtained by X-ray diffraction of the phase may be preferably equal to or greater than 1 deg based on diffraction angle of 2θ in the case where CuKα ray is used as a specific X ray, and the insertion rate is 1 deg/min. Thereby, lithium ions are more smoothly inserted and extracted, and reactivity with the electrolytic solution is decreased. It is to be noted that, in some cases, the SnCoC-containing material includes a phase containing a simple substance or part of the respective constituent elements in addition to the low-crystalline phase or the amorphous phase.

Whether or not the diffraction peak obtained by the X-ray diffraction corresponds to the reaction phase capable of reacting with lithium is allowed to be easily determined by comparison between X-ray diffraction charts before and after electrochemical reaction with lithium. For example, if the position of the diffraction peak after electrochemical reaction with lithium is changed from the position of the diffraction peak before the electrochemical reaction with lithium, the obtained diffraction peak corresponds to the reaction phase capable of reacting with lithium. In this case, for example, the diffraction peak of the low crystalline reaction phase or the amorphous reaction phase is seen in the range of 2θ=from 20 deg to 50 deg both inclusive. Such a reaction phase may have, for example, the foregoing respective constituent elements, and the low crystalline or amorphous structure thereof possibly results from existence of C mainly.

In the SnCoC-containing material, part or all of carbon as a constituent element may be preferably bonded to a metal element or a metalloid element as other constituent element, since cohesion or crystallization of tin and/or the like is suppressed thereby. The bonding state of elements is allowed to be checked with the use, for example, of XPS and/or the like. In a commercially available device, for example, as a soft X ray, Al—Kα ray, Mg—Kα ray, or the like may be used. In the case where part or all of carbon are bonded to a metal element, a metalloid element, or the like, the peak of a synthetic wave of 1s orbit of carbon (C1s) is shown in a region lower than 284.5 eV. It is to be noted that in the device, energy calibration is made so that the peak of 4f orbit (Au4f) of gold (Au) atom is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis may be made with the use of commercially available software to isolate both peaks from each other. In the waveform analysis, the position of the main peak existing on the lowest bound energy side is the energy standard (284.8 eV).

It is to be noted that the SnCoC-containing material is not limited to the material (SnCoC) configured of only tin, cobalt, and carbon as constituent elements. The SnCoC-containing material may further contain, for example, one or more of Si, Fe, Ni, Cr, In, Nb, Ge, Ti, Mo, Al, P, Ga, Bi, and the like as constituent elements in addition to tin, cobalt, and carbon.

In addition to the SnCoC-containing material, a material (an SnCoFeC-containing material) containing tin, cobalt, iron, and carbon as constituent elements may be also preferable. The composition of the SnCoFeC-containing material may be arbitrarily set. For example, the composition in which the iron content may be set small is as follows. That is, the carbon content may be from 9.9 mass % to 29.7 mass % both inclusive, the iron content may be from 0.3 mass % to 5.9 mass % both inclusive, and the ratio (Co/(Sn+Co)) of contents of tin and cobalt may be from 30 mass % to 70 mass % both inclusive. Further, the composition in which the iron content is set large is as follows. That is, the carbon content may be from 11.9 mass % to 29.7 mass % both inclusive, the ratio ((Co+Fe)/(Sn+Co+Fe)) of contents of tin, cobalt, and iron may be from 26.4 mass % to 48.5 mass % both inclusive, and the ratio (Co/(Co+Fe)) of contents of cobalt and iron may be from 9.9 mass % to 79.5 mass % both inclusive. In such a composition range, high energy density is obtainable. It is to be noted that the physical properties (such as half bandwidth) of the SnCoFeC-containing material are similar to the physical properties of the foregoing SnCoC-containing material.

In addition thereto, other anode material may be, for example, one or more of metal oxides, polymer compounds, and the like. Examples of the metal oxides may include iron oxide, ruthenium oxide, and molybdenum oxide. Examples of the polymer compounds may include polyacetylene, polyaniline, and polypyrrole.

The anode active material layer 22B may be formed, for example, by one or more of a coating method, a vapor-phase deposition method, a liquid-phase deposition method, a spraying method, a firing method (a sintering method), and the like. The coating method is a method in which, for example, after a particulate (powder) anode active material is mixed with an anode binder and/or the like, the mixture is dispersed in a solvent such as an organic solvent, and the anode current collector 22A is coated with the resultant. Examples of the vapor-phase deposition method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase deposition method may include an electrolytic plating method and an electroless plating method. The spraying method is a method in which an anode active material in a fused state or a semi-fused state is sprayed to the anode current collector 22A. The firing method is a method in which after the anode current collector 22A is coated with a mixture diffused in a solvent with the use, for example, of a coating method, heat treatment is performed at temperature higher than the melting point of the anode binder and/or the like. Examples of the firing method may include an atmosphere firing method, a reactive firing method, and a hot press firing method.

In the secondary battery, as described above, in order to prevent lithium metal from being unintentionally precipitated on the anode 22 in the middle of charge, the electrochemical equivalent of the anode material capable of inserting and extracting lithium ions is larger than the electrochemical equivalent of the cathode. Further, in the case where the open circuit voltage (that is, the battery voltage) at the time of completely-charged state is equal to or greater than 4.25 V, the extraction amount of lithium ions per unit mass is larger than that in the case where the open circuit voltage is 4.2 V even if the same cathode active material is used. Therefore, amounts of the cathode active material and the anode active material are adjusted accordingly. Thereby, high energy density is obtainable.

The maximum utilization rate (hereinafter simply referred to as "anode utilization rate") in a full-charged state of the anode 22 is not particularly limited, and may be arbitrarily set according to the ratio between the capacity of the cathode 21 and the capacity of the anode 22.

The foregoing "anode utilization rate" is expressed by [utilization rate Z (%)=(X/Y)×100], where X represents an insertion amount of lithium ions per unit area in a full-charged state of the anode 22, and Y represents an amount of lithium ions capable of being electrochemically inserted per unit area of the anode 22.

The insertion amount X may be obtained, for example, by the following procedure. First, a secondary battery is charged until the secondary battery becomes in a full-charged state. Thereafter, the secondary battery is disassembled, and a portion (an inspection anode) opposed to the cathode 21 of the anode 22 is cut out. Subsequently, with the use of the inspection anode, an evaluation battery in which metal lithium is a counter electrode is assembled. Finally, the evaluation battery is discharged to measure the discharging capacity at the time of initial discharge, and thereafter, the discharging capacity is divided by the area of the inspection anode, and thereby, the insertion amount X is calculated. In this case, the term "discharge" refers to electrical conduction in a direction in which lithium ions are discharged from the inspection anode. For example, constant current discharge is performed at current density of $0.1$ mA/cm$^2$ until the battery voltage reaches 1.5 V.

In contrast, the insertion amount Y may be calculated, for example, as follows. The foregoing discharged evaluation battery is subjected to constant-current and constant-voltage charge until the battery voltage reaches 0 V to measure a charging capacity, and thereafter, the charging capacity is divided by the area of the inspection anode to obtain the insertion amount Y. In this case, the term "charge" refers to electrical conduction in a direction in which lithium ions are inserted in the inspection anode. For example, constant voltage charge is performed at current density of 0.1 mA/cm$^2$ and at a battery voltage of 0 V until the current density reaches 0.02 mA/cm$^2$.

In particular, the anode utilization rate may be preferably from 35% to 80% both inclusive, since thereby, superior initial charge-discharge characteristics, superior cycle characteristics, superior load characteristics, and the like are obtainable.

As illustrated in FIG. 6, the cathode active material layer 21B may be provided, for example, in part (such as a central region in a longitudinal direction) of the surface of the cathode current collector 21A. In contrast, the anode active material layer 22B may be provided, for example, on the whole surface of the anode current collector 22A. Thereby, the anode active material layer 22B is provided in a region (an opposed region R1) opposed to the cathode active material layer 21B, and a region (a non-opposed region R2) not opposed to the cathode active material layer 21B. In this case, in the anode active material layer 22B, a portion provided in the opposed region R1 has a role in charge and discharge, while a portion provided in the non-opposed region R2 is less likely to have a role in charge and discharge. It is to be noted that in FIG. 6, the cathode active material layer 21B and the anode active material layer 22B are shown shaded.

As described above, with regard to the physical properties of the anode active material contained in the anode active material 22B, a specific ion is detected by the positive ion analysis with the use of TOF-SIMS. However, when lithium ions are inserted and extracted in the anode active material at the time of charge and discharge, the physical properties of the anode active material may be changed from the state at the time of forming the anode active material 22B.

However, in the non-opposed region R2, the physical properties of the anode active material 22B are retained being little-affected by charge and discharge. Therefore, with regard to the physical properties of the anode active material, the anode active material 22B in the non-opposed region R2 may be preferably examined. One reason for this is that, in this case, the physical properties of the anode active material are allowed to be accurately examined reproducibly without depending on a charge-discharge history (such as presence or absence of charge and discharge and the number of charge and discharge). The same is applied to other parameters such as the physical properties of the anode active material (the average area occupancy and the average grain diameter of the crystal grains) and the composition (the atomic ratios x, y, and z).

[Separator]

The separator 23 separates the cathode 21 from the anode 22, and passes lithium ions while preventing current short circuit resulting from contact of both electrodes. The separator 23 may be a porous film made, for example, of a synthetic resin, ceramics, or the like. The separator 23 may be a laminated film in which two or more types of porous films are laminated. Examples of the synthetic resin may include polytetrafluoroethylene, polypropylene, and polyethylene.

In particular, the separator 23 may include, for example, a polymer compound layer on a single surface or both surfaces of the foregoing porous film (a base material layer). Thereby, adhesibility of the separator 23 with respect to the cathode 21 and the anode 22 are improved, and therefore, skewness of the spirally wound electrode body 20 and the like are suppressed. Thereby, a decomposition reaction of the electrolytic solution is suppressed, and liquid leakage of the electrolytic solution with which the base material layer is impregnated is suppressed. Accordingly, even if charge and discharge are repeated, the resistance of the secondary battery is less likely to be increased, and battery swollenness is suppressed.

The polymer compound layer may contain, for example, a polymer material such as polyvinylidene fluoride, since such a polymer material has a superior physical strength and is electrochemically stable. However, the polymer material may be a polymer material other than polyvinylidene fluoride. Upon forming the polymer compound layer, for example, after a solution in which the polymer material is dissolved is prepared, the base material layer is coated with the solution, and the resultant is subsequently dried. Alternatively, the base material layer may be soaked in the solution and may be subsequently dried.

[Electrolytic Solution]

The separator 23 is impregnated with an electrolytic solution as a liquid electrolyte. The electrolytic solution contains a solvent and an electrolyte salt, and may further contain one or more of other materials such as an additive.

The solvent contains one or more of non-aqueous solvents such as an organic solvent. Examples of the non-aqueous solvents may include a cyclic ester carbonate, a chain ester carbonate, lactone, a chain carboxylic ester, and nitrile, since thereby, a superior battery capacity, superior cycle characteristics, superior conservation characteristics, and the like are obtained. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methylpropyl carbonate. Examples of the lactone may include γ-butyrolactone and γ-valerolactone. Examples of the carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

In addition thereto, examples of the non-aqueous solvents may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. Thereby, a similar advantage is obtained.

In particular, one or more of ethylene carbonate, propylene carbonate, dimethyl carbonate, diethyl carbonate, and ethyl methyl carbonate may be preferable, since thereby, a superior battery capacity, superior cycle characteristics, superior conservation characteristics, and the like are obtained. In this case, a combination of a high viscosity (high dielectric constant) solvent (for example, specific dielectric constant $\epsilon \geq 30$) such as ethylene carbonate and propylene carbonate and a low viscosity solvent (for example, viscosity≤1 mPa·s) such as dimethyl carbonate, ethylmethyl carbonate, and diethyl carbonate may be more preferable. One reason for this is that the dissociation property of the electrolyte salt and ion mobility are improved.

In particular, the solvent may contain one or more of an unsaturated cyclic ester carbonate, a halogenated ester carbonate, sultones (cyclic sulfonic esters), and acid anhydrides, since thereby, chemical stability of the electrolytic solution is improved. The unsaturated cyclic ester carbonate is a cyclic ester carbonate having one or more unsaturated bonds (carbon-carbon double bonds), and may be, for example, vinylene carbonate, vinylethylene carbonate, methyleneethylene carbonate, or the like. The halogenated ester carbonate is a cyclic ester carbonate or a chain ester carbonate containing one or more halogens as constituent elements. Examples of the cyclic halogenated ester carbonate may include 4-fluoro-1,3-dioxole-2-one, and 4,5-difluoro-1,3-dioxole-2-one. Examples of the halogenated ester carbonate may include fluoromethyl methyl carbonate, bis (fluoromethyl) carbonate, and difluoromethyl methyl carbonate. Examples of the sultones may include propane sultone and propene sultone. Examples of the acid anhydrides may include a succinic anhydride, an ethane disulfonic anhydride, and a sulfobenzoic anhydride. However, examples of the solvent are not limited to the above-described materials, and may include other materials.

The electrolyte salt may contain, for example, one or more of salts such as lithium salts. However, the electrolyte salt may contain, for example, a salt other than the lithium salt. Examples of "the salt other than the lithium salt" may include a light metal salt other than the lithium salt.

Examples of the lithium salts may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium tetrachloroaluminate ($LiAlCl_4$), dilithium hexafluorosilicate ($Li_2SiF_6$), lithium chloride ($LiCl$), and lithium bromide ($LiBr$). Thereby, a superior battery capacity, superior cycle characteristics, superior conservation characteristics, and the like are obtained.

In particular, one or more of $LiPF_6$, $LiBF_4$, $LiClO_4$, and $LiAsF_6$ may be preferable, and $LiPF_6$ may be more preferable, since the internal resistance is thereby lowered, and therefore, a higher effect is obtained. However, examples of the electrolyte salt are not limited to the above-described materials, and may include other materials.

Although the content of the electrolyte salt is not particularly limited, in particular, the content thereof may be preferably from 0.3 mol/kg to 3.0 mol/kg both inclusive with respect to the solvent, since high ion conductivity is obtained thereby.

[Operation of Secondary Battery]

The secondary battery may operate, for example, as follows. At the time of charge, lithium ions extracted from the cathode 21 are inserted in the anode 22 through the electrolytic solution. In contrast, at the time of discharge, lithium ions extracted from the anode 22 are inserted in the cathode 21 through the electrolytic solution.

In the secondary battery, as described above, the anode active material of the anode 22 may be preferably pre-doped with lithium ions in an uncharged state. One reason for this is that, in this case, the irreversible capacity at the time of initial charge and initial discharge is decreased, and therefore, the initial charge and discharge characteristics, the cycle characteristics, and the like are improved. With regard to presence or absence of pre-doping, as described referring to FIG. 6, the anode active material 22B in the non-opposed region R2 may be preferably examined.

[Method of Manufacturing Secondary Battery]

The secondary battery may be manufactured, for example, by the following procedure.

First, the cathode 21 is fabricated. A cathode active material is mixed with a cathode binder, a cathode electric conductor, and the like to prepare a cathode mixture. Subsequently, the cathode mixture is dispersed in an organic solvent or the like to obtain paste cathode mixture slurry. Subsequently, both surfaces of the cathode current collector 21A are coated with the cathode mixture slurry, which is dried to form the cathode active material layer 21B. Subsequently, the cathode active material layer 21B may be compression-molded with the use of a roll pressing machine and/or the like. In this case, compression-molding may be performed while heating the cathode active material layer 21B, or compression-molding may be repeated several times.

Upon fabricating the anode 22, for example, the anode active material layer 22B is formed on the anode current collector 22A by a procedure similar to that of the cathode 21 described above. Specifically, an anode active material containing the foregoing active material is mixed with an anode binder, an anode electric conductor, and the like to prepare an anode mixture, which is subsequently dispersed in an organic solvent or the like to form paste anode mixture slurry. Subsequently, both surfaces of the anode current collector 22A are coated with the anode mixture slurry, which is dried to form the anode active material layer 22B. Thereafter, the anode active material layer 22B is compression-molded.

Finally, the secondary battery is assembled with the use of the cathode 21 and the anode 22. The cathode lead 24 is attached to the cathode current collector 21A with the use of a welding method and/or the like, and the anode lead 25 is attached to the anode current collector 22A with the use of a welding method and/or the like. Subsequently, the cathode 21 and the anode 22 are layered with the separator 23 in between and are spirally wound in the longitudinal direction, and thereby, the battery element 20 is formed. Subsequently, the battery element 20 is contained in the battery can 11, and thereafter, the insulating plate 12 is laid on the battery element 20. Subsequently, the cathode lead 24 is attached to the cathode pin 15 with the use of a welding method and/or the like, and the anode lead 25 is attached to the battery can 11 with the use of a welding method and/or the like. In this case, the battery cover 13 is fixed to the open end of the battery can 11 by a laser welding method and/or the like. Finally, an electrolytic solution is injected into the battery can 11 from the injection hole 19, the separator 23 is impregnated with the electrolytic solution, and thereafter, the injection hole 19 is sealed by the sealing member 19A.

[Function and Effect of Secondary Battery]

According to the square-type secondary battery, the anode active material layer 22B of the anode 22 contains the foregoing active material as an anode active material. Therefore, the electric resistance of the anode active material is lowered, a decomposition reaction of the electrolytic solution and the like are suppressed, and therefore, superior battery characteristics are obtainable. Other effects are similar to those of the active material.

[2-2. Cylindrical-Type]

Figure 7:
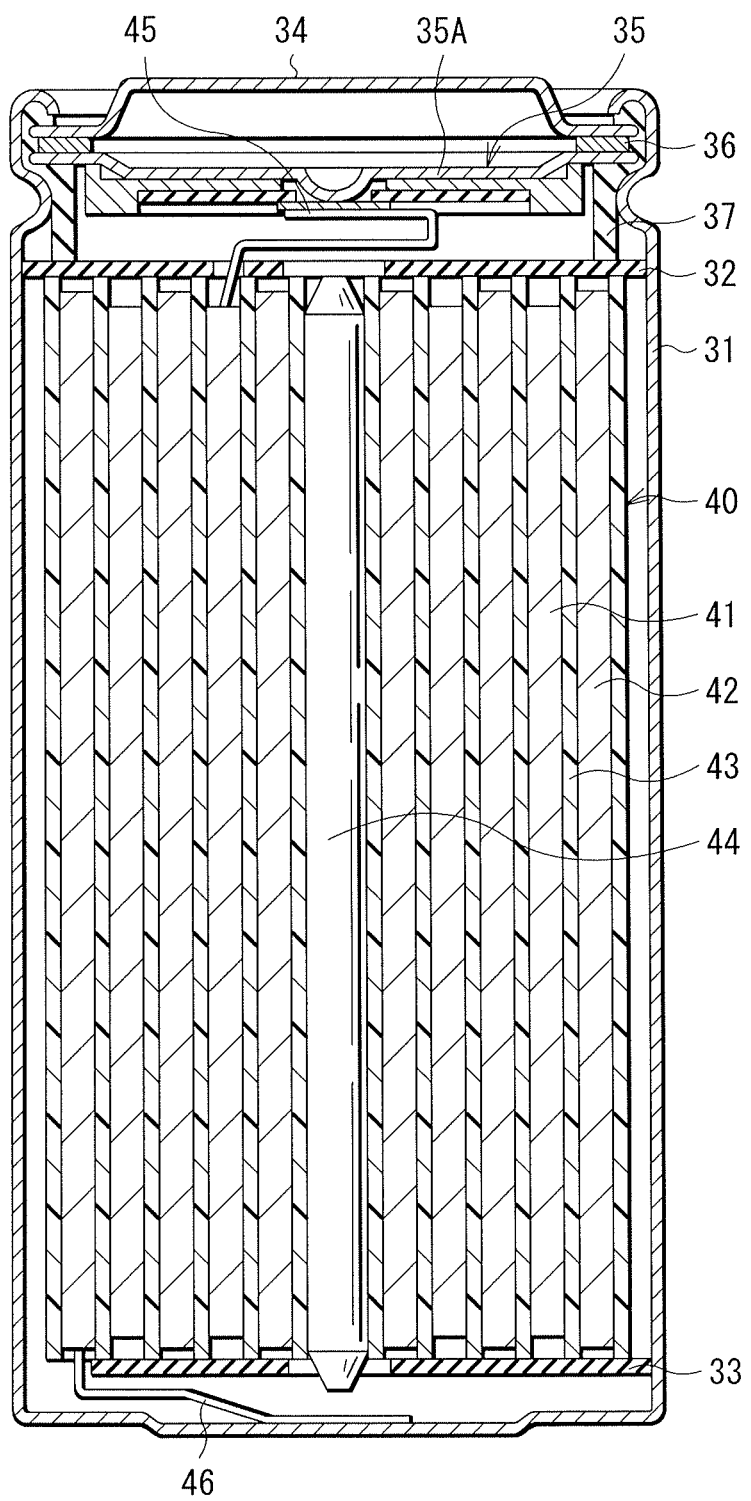
FIG. 7 is a cross-sectional view illustrating a configuration of a secondary battery (cylindrical-type) using the electrode in the embodiment of the present application.
Figure 8:
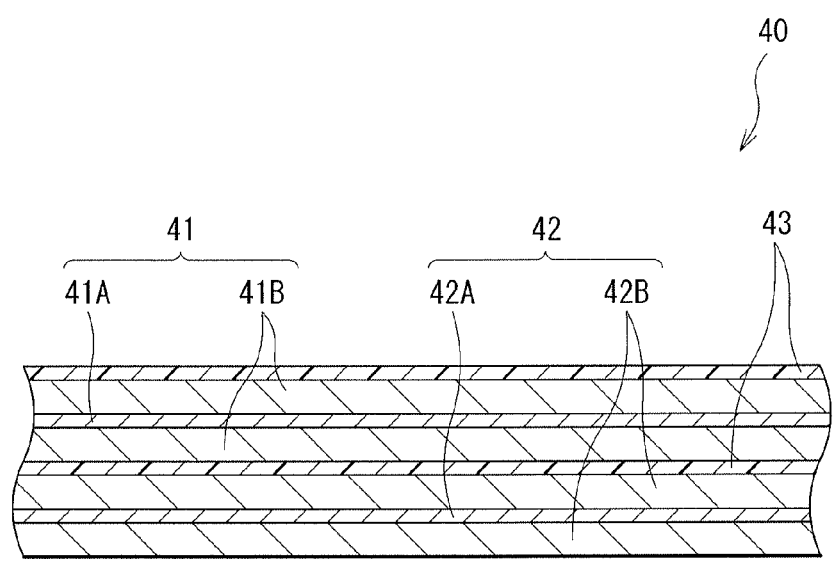
FIG. 8 is a cross-sectional view illustrating an enlarged part of a spirally wound electrode body illustrated in FIG. 7.

FIG. 7 and FIG. 8 illustrate cross-sectional configurations of a cylindrical-type secondary battery. FIG. 8 illustrates enlarged part of a spirally wound electrode body 40 illustrated in FIG. 7. In the following description, the components of the above-described square-type secondary battery will be used as appropriate.

[Whole Configuration of Secondary Battery]

The secondary battery described here is a so-called cylindrical-type lithium ion secondary battery. For example, the secondary battery may contain a pair of insulating plates 32 and 33 and the spirally wound electrode body 40 inside a battery can 31 in the shape of a hollow cylinder. The spirally wound electrode body 40 may be formed, for example, by laminating a cathode 41 and an anode 42 with a separator 43 in between, and subsequently spirally winding the resultant laminated body.

The battery can 31 may have, for example, a hollow structure in which one end of the battery can 31 is closed and the other end of the battery can 31 is opened. The battery can 31 may be made, for example, of iron, aluminum, an alloy thereof, or the like. The surface of the battery can 31 may be plated with nickel or the like. The pair of insulating plates 32 and 33 is arranged to sandwich the spirally wound electrode body 40 in between, and to extend perpendicularly to the spirally wound periphery surface of the spirally wound electrode body 40.

At the open end of the battery can 31, a battery cover 34, a safety valve mechanism 35, and a positive temperature coefficient device (PTC element) 36 are attached by being swaged with a gasket 37. Thereby, the battery can 31 is hermetically sealed. The battery cover 34 may be made, for example, of a material similar to that of the battery can 31. The safety valve mechanism 35 and the PTC element 36 are provided inside the battery cover 34. The safety valve mechanism 35 is electrically connected to the battery cover 34 through the PTC element 36. In the safety valve mechanism 35, in the case where the internal pressure becomes a certain level or more by internal short circuit, external heating, or the like, a disk plate 35A inverts to cut electric connection between the battery cover 34 and the spirally wound electrode body 40. The PTC element 36 prevents abnormal heat generation resulting from a large current. As temperature rises, resistance of the PTC element 36 is increased accordingly. The gasket 37 may be made, for example, of an insulating material. The surface of the gasket 37 may be coated with asphalt.

In the hollow space of the center of the spirally wound electrode body 40, for example, a center pin 44 may be inserted. However, the center pin 44 is not necessarily included therein. For example, a cathode lead 45 made of an electrically-conductive material such as aluminum may be connected to the cathode 41. For example, an anode lead 46 made of an electrically-conductive material such as nickel may be connected to the anode 42. For example, the cathode lead 45 may be welded to the safety valve mechanism 35, and may be electrically connected to the battery cover 34. For example, the anode lead 46 may be welded to the battery can 31, and may be electrically connected to the battery can 31.

The cathode 41 may have, for example, a cathode active material layer 41B on a single surface or both surfaces of a cathode current collector 41A. The anode 42 may have, for example, an anode active material layer 42B on a single surface or both surfaces of an anode current collector 42A. The configurations of the cathode current collector 41A, the cathode active material layer 41B, the anode current collector 42A, and the anode active material layer 42B are similar to the configurations of the cathode current collector 21A, the cathode active material layer 21B, the anode current collector 22A, and the anode active material layer 22B, respectively. That is, the anode active material layer 42B of the anode 42 as the electrode contains the foregoing active material as an anode active material. The configuration of the separator 43 is similar to the configuration of the separator 23. The composition of the electrolytic solution with which the separator 43 is impregnated is similar to the composition of the electrolytic solution in the square-type-secondary battery.

[Operation of Secondary Battery]

The cylindrical-type secondary battery may operate, for example, as follows. At the time of charge, lithium ions extracted from the cathode 41 are inserted in the anode 42 through the electrolytic solution. In contrast, at the time of discharge, lithium ions extracted from the anode 42 are inserted in the cathode 41 through the electrolytic solution.

[Method of Manufacturing Secondary Battery]

The cylindrical-type secondary battery may be manufactured, for example, by the following procedure. First, for example, the cathode 41 and the anode 42 are fabricated by a fabrication procedure similar to that of the cathode 21 and the anode 22. That is, the cathode active material layer 41B is formed on both surfaces of the cathode current collector 41A to form the cathode 41, and the anode active material layer 42B is formed on both surfaces of the anode current collector 42A to form the anode 42. Subsequently, the cathode lead 45 is attached to the cathode 41 with the use of a welding method and/or the like, and the anode lead 46 is attached to the anode 42 with the use of a welding method and/or the like similarly. Subsequently, the cathode 41 and the anode 42 are layered with the separator 43 in between and are spirally wound to fabricate the spirally wound electrode body 40. Thereafter, in the hollow space of the center of the spirally wound electrode body 40, the center pin 44 is inserted. Subsequently, the spirally wound electrode body 40 is sandwiched between the pair of insulating plates 32 and 33, and is contained in the battery can 31. In this example, the cathode lead 45 is attached to the safety valve mechanism 35 with the use of a welding method and/or the like, and an end tip of the anode lead 46 is attached to the battery can 31 with the use of a welding method and/or the like. Subsequently, the electrolytic solution is injected into the battery can 31, and the separator 43 is impregnated with the electrolytic solution. Finally, the battery cover 34, the safety valve mechanism 35, and the PTC element 36 are attached to the open end of the battery can 31, and are fixed by being swaged with the gasket 37.

[Function and Effect of Secondary Battery]

According to the cylindrical-type secondary battery, the anode active material layer 42B of the anode 42 contains the foregoing active material as an anode active material. Therefore, superior battery characteristics are obtainable for a reason similar to that of the square-type secondary battery. Other functions and other effects are similar to those of the square-type secondary battery.

[2-3. Laminated-Film-Type]

Figure 9:
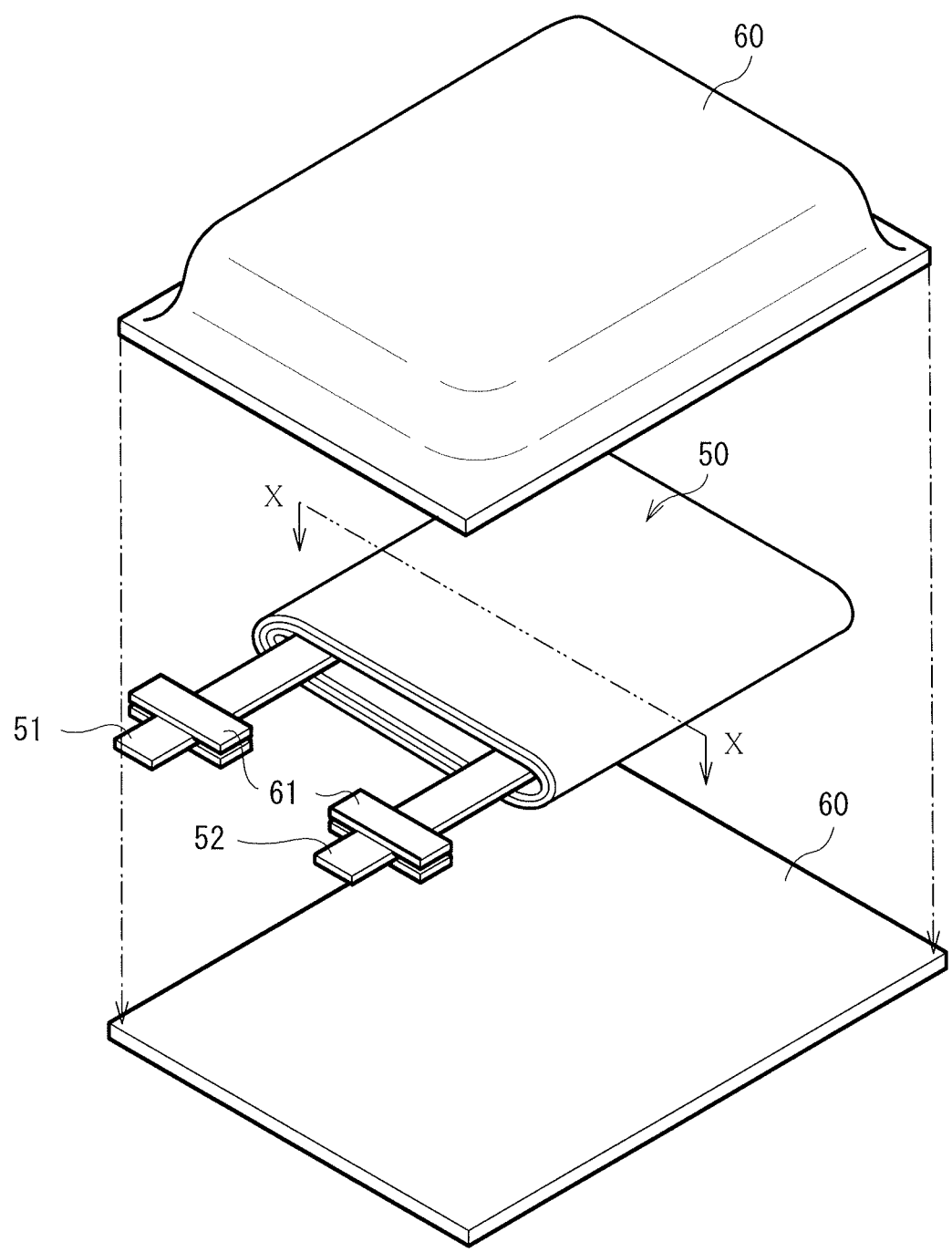
FIG. 9 is an exploded perspective view illustrating a configuration of a secondary battery (laminated-film-type) using the electrode in the embodiment of the present application.
Figure 10:
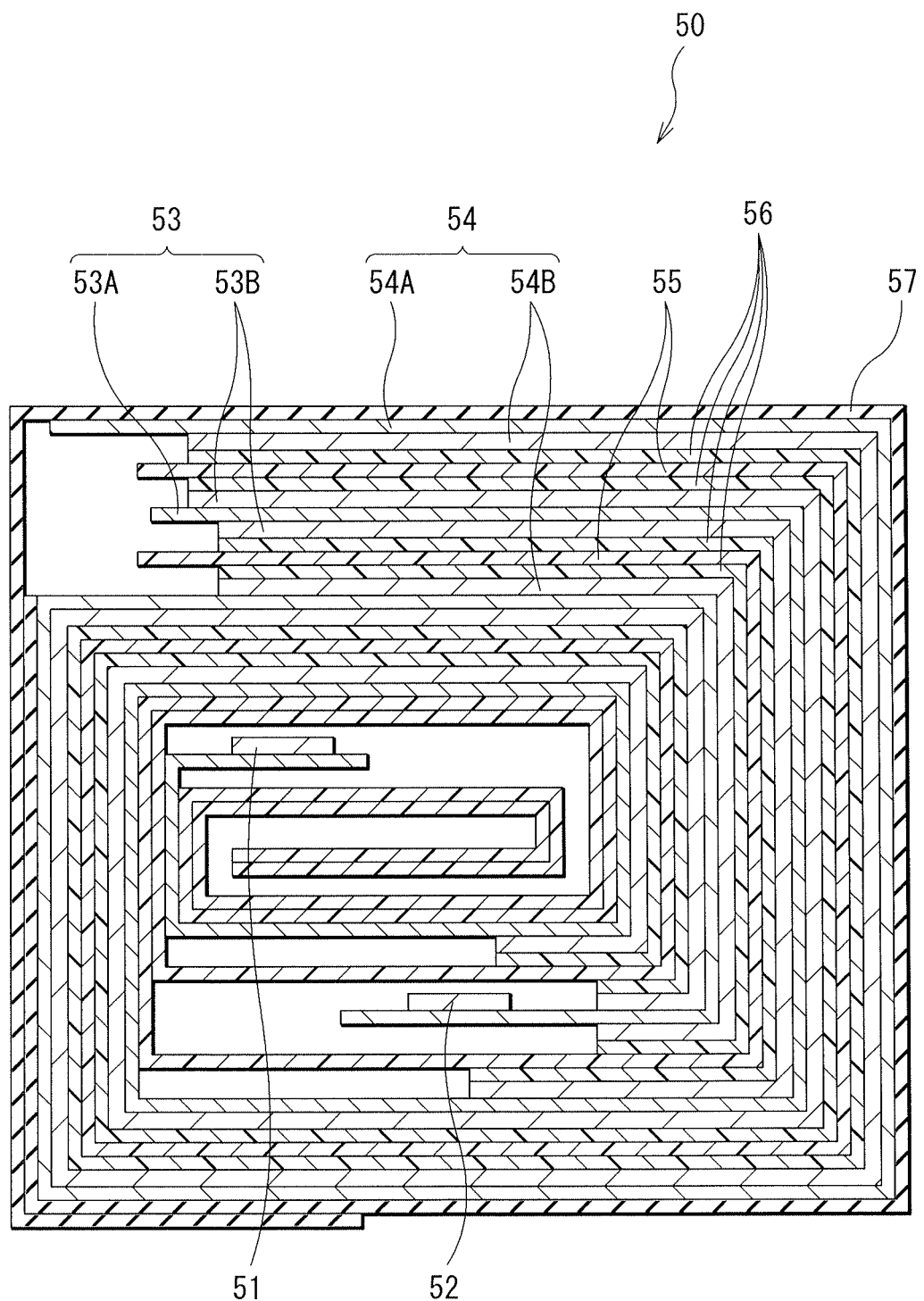
FIG. 10 is a cross-sectional view taken along a line X-X of a spirally wound electrode body illustrated in FIG. 9.

FIG. 9 illustrates an exploded perspective configuration of a laminated-film-type secondary battery. FIG. 10 illustrates an enlarged cross-section taken along a line X-X of a spirally wound electrode body 50 illustrated in FIG. 9. FIG. 9 illustrates a state in which the spirally winding electrode body 50 is separated from two package members 60. In the following description, the components of the cylindrical-type secondary battery described above will be used as necessary.

[Whole Configuration of Secondary Battery]

The secondary battery described here may be, for example, a so-called laminated-film-type lithium ion secondary battery. For example, in the secondary battery, the spirally wound electrode body 50 may be contained in a film-like outer package member 60. The spirally wound electrode body 50 may be formed, for example, by laminating a cathode 53 and an anode 54 with a separator 55 and an electrolyte layer 56 in between, and subsequently spirally winding the resultant laminated body. A cathode lead 51 is attached to the cathode 53, and an anode lead 52 is attached to the anode 54. The outermost periphery of the spirally wound electrode body 50 is protected by a protective tape 57.

The cathode lead 51 and the anode lead 52 may be, for example, led out from inside to outside of the outer package member 60 in the same direction. The cathode lead 51 may be made, for example, of one or more of electrically-conductive materials such as aluminum. The anode lead 52 may be made, for example, of one or more of electrically-conducive materials such as copper, nickel, and stainless steel. These electrically-conductive materials may be in the shape, for example, of a thin plate or mesh.

The outer package member 60 may be a laminated film in which, for example, a fusion bonding layer, a metal layer, and a surface protective layer are laminated in this order. The outer package member 60 may be formed by, for example, layering two laminated films so that the fusion bonding layers and the spirally wound electrode body 50 are opposed to each other, and subsequently fusion-bonding the respective outer edges of the fusion bonding layers to each other. Alternatively, the two laminated films may be attached to each other by an adhesive or the like. Examples of the fusion bonding layer may include a film made of polyethylene, polypropylene, or the like. Examples of the metal layer may include an aluminum foil. Examples of the surface protective layer may include a film made of nylon, polyethylene terephthalate, or the like.

In particular, as the outer package member 60, an aluminum laminated film in which a polyethylene film, an aluminum foil, and a nylon film are laminated in this order may be preferable. However, the outer package member 60 may be made of a laminated film having other laminated structure, a polymer film such as polypropylene, or a metal film.

An adhesive film 61 to protect from outside air intrusion is inserted between the outer package member 60 and the cathode lead 51 and between the outer package member 60 and the anode lead 52. The adhesive film 61 is made of a material having adhesibility with respect to the cathode lead 51 and the anode lead 52. Examples of the material having adhesibility may include a polyolefin resin. More specific examples thereof may include polyethylene, polypropylene, modified polyethylene, and modified polypropylene.

The cathode 53 may have, for example, a cathode active material layer 53B on a single surface or both surfaces of a cathode current collector 53A. The anode 54 may have, for example, an anode active material layer 54B on a single surface or both surfaces of an anode current collector 54A. The configurations of the cathode current collector 53A, the cathode active material layer 53B, the anode current collector 54A, and the anode active material layer 54B are similar to the configurations of the cathode current collector 21A, the cathode active material layer 21B, the anode current collector 22A, and the anode active material layer 22B, respectively. That is, the anode active material layer 54B of the anode 54 as an electrode contains the foregoing active material as an anode active material. The configuration of the separator 55 is similar to the configuration of the separator 23.

In the electrolyte layer 56, an electrolytic solution is supported by a polymer compound. The electrolyte layer 56 is a so-called gel electrolyte, since thereby, high ion conductivity (such as 1 mS/cm or more at room temperature) is obtained and liquid leakage of the electrolytic solution is prevented. The electrolyte layer 56 may further contain other material such as an additive.

The polymer compound contains one or more of polymer materials. Examples of the polymer materials may include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. In addition thereto, examples of the polymer materials may include a copolymer. Examples of the copolymer may include a copolymer of vinylidene fluoride and hexafluoro propylene. In particular, polyvinylidene fluoride or the copolymer of vinylidene fluoride and hexafluoro propylene may be preferable, and polyvinylidene fluoride may be more preferable, since such a polymer compound is electrochemically stable.

For example, the composition of the electrolytic solution may be similar to the composition of the electrolytic solution of the square-type secondary battery. However, in the electrolyte layer 56 as a gel electrolyte, the term "solvent" of the electrolytic solution refers to a wide concept including not only a liquid solvent but also a material having ion conductivity capable of dissociating an electrolyte salt. Therefore, in the case where a polymer compound having ion conductivity is used, the polymer compound is also included in the solvent.

It is to be noted that the electrolytic solution may be used as it is instead of the gel electrolyte layer 56. In this case, the separator 55 is impregnated with the electrolytic solution.

[Operation of Secondary Battery]

The secondary battery may operate, for example, as follows. At the time of charge, lithium ions extracted from the cathode 53 are inserted in the anode 54 through the electrolyte layer 56. In contrast, at the time of discharge, lithium ions extracted from the anode 54 are inserted in the cathode 53 through the electrolyte layer 56.

[Method of Manufacturing Secondary Battery]

The secondary battery including the gel electrolyte layer 56 may be manufactured, for example, by the following three types of procedures.

In the first procedure, the cathode 53 and the anode 54 are fabricated by a fabrication procedure similar to that of the cathode 21 and the anode 22. That is, the cathode active material layer 53B is formed on both surfaces of the cathode current collector 53A to form the cathode 53, and the anode active material layer 54B is formed on both surfaces of the anode current collector 54A to form the anode 54. Subsequently, a precursor solution including an electrolytic solution, a polymer compound, and a solvent such as an organic solvent is prepared. Thereafter, the cathode 53 and the anode 54 are coated with the precursor solution to form the gel electrolyte layer 56. Subsequently, the cathode lead 51 is attached to the cathode current collector 53A with the use of a welding method and/or the like, and the anode lead 52 is attached to the anode current collector 54A with the use of a welding method and/or the like. Subsequently, the cathode 53 and the anode 54 are layered with the separator 55 in between and are spirally wound to fabricate the spirally wound electrode body 50. Thereafter, the protective tape 57 is adhered to the outermost periphery thereof. Subsequently, after the spirally wound electrode body 50 is sandwiched between two pieces of film-like outer package members 60, the outer edges of the outer package members 60 are bonded with the use of a thermal fusion bonding method and/or the like. Thereby, the spirally wound electrode body 50 is enclosed into the outer package members 60. In this case, the adhesive films 61 are inserted between the cathode lead 51 and the outer package member 60 and between the anode lead 52 and the outer package member 60.

In the second procedure, the cathode lead 51 is attached to the cathode 53, and the anode lead 52 is attached to the anode 54. Subsequently, the cathode 53 and the anode 54 are layered with the separator 55 in between and are spirally wound to fabricate a spirally wound body as a precursor of the spirally wound electrode body 50. Thereafter, the protective tape 57 is adhered to the outermost periphery thereof. Subsequently, after the spirally wound body is arranged between two pieces of the film-like outer package members 60, the outermost peripheries except for one side are bonded with the use of a thermal fusion bonding method and/or the like to obtain a pouched state, and the spirally wound body is contained in the pouch-like outer package member 60. Subsequently, an electrolytic solution, a monomer as a raw material for the polymer compound, a polymerization initiator, and other materials such as a polymerization inhibitor are mixed to prepare a composition for electrolyte. Subsequently, the composition for electrolyte is injected into the pouch-like outer package member 60. Thereafter, the outer package member 60 is hermetically sealed with the use of a thermal fusion bonding method and/or the like. Subsequently, the monomer is thermally polymerized, and thereby, a polymer compound is formed. Accordingly, the polymer compound is impregnated with the electrolytic solution, the polymer compound gelates, and accordingly, the electrolyte layer 56 is formed.

In the third procedure, the spirally wound body is fabricated and contained in the pouch-like outer package member 60 in a manner similar to that of the foregoing second procedure, except that the separator 55 with both surfaces coated with a polymer compound is used. Examples of the polymer compound with which the separator 55 is coated may include a polymer (a homopolymer, a copolymer, or a multicomponent copolymer) containing vinylidene fluoride as a component. Specific examples of the homopolymer may include polyvinylidene fluoride. Specific examples of the copolymer may include a binary copolymer containing vinylidene fluoride and hexafluoro propylene as components. Specific examples of the multicomponent copolymer may include a ternary copolymer containing vinylidene fluoride, hexafluoro propylene, and chlorotrifluoroethylene as components. It is to be noted that, in addition to the polymer containing vinylidene fluoride as a component, other one or more polymer compounds may be used. Subsequently, an electrolytic solution is prepared and injected into the outer package member 60. Thereafter, the opening of the outer package member 60 is hermetically sealed with the use of a thermal fusion bonding method and/or the like. Subsequently, the resultant is heated while a weight is applied to the outer package member 60, and the separator 55 is adhered to the cathode 53 and the anode 54 with the polymer compound in between. Thereby, the polymer compound is impregnated with the electrolytic solution, and accordingly, the polymer compound is gelated to form the electrolyte layer 56.

In the third procedure, swollenness of the secondary battery is suppressed more than in the first procedure. Further, in the third procedure, the monomer as a raw material of the polymer compound, the solvent, and the like are less likely to be left in the electrolyte layer 56 compared to in the second procedure. Therefore, the formation step of the polymer compound is favorably controlled. Therefore, the cathode 53, the anode 54, and the separator 55 sufficiently adhere to the electrolyte layer 56.

[Function and Effect of Secondary Battery]

According to the laminated-film-type secondary battery, the anode active material layer 54B of the anode 54 contains the foregoing active material as an anode active material. Therefore, superior battery characteristics are obtainable for a reason similar to that of the square-type secondary battery. Other functions and other effects are similar to those of the square-type secondary battery.

[3. Applications of Secondary Battery]

Next, description will be given of application examples of the foregoing secondary battery.

Applications of the secondary battery are not particularly limited as long as the secondary battery is applied to a machine, a device, an instrument, an apparatus, a system (collective entity of a plurality of devices and the like), or the like that is allowed to use the secondary battery as a driving electric power source, an electric power storage source for electric power storage, or the like. The secondary battery used as an electric power source may be a main electric power source (electric power source used preferentially), or may be an auxiliary electric power source (electric power source used instead of a main electric power source or used being switched from the main electric power source). In the case where the secondary battery is used as an auxiliary electric power source, the main electric power source type is not limited to the secondary battery.

Examples of applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a personal digital assistant. Further examples thereof may include a mobile lifestyle electric appliance such as an electric shaver; a memory device such as a backup electric power source and a memory card; an electric power tool such as an electric drill and an electric saw; a battery pack used for a notebook personal computer or the like as an attachable and detachable electric power source; a medical electronic apparatus such as a pacemaker and a hearing aid; an electric vehicle such as an electric automobile (including a hybrid automobile); and an electric power storage system such as a home battery system for storing electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, or the like. One reason for this is that, in these applications, since superior battery characteristics are demanded, performance is effectively improved with the use of the secondary battery according to the embodiment of the present application. It is to be noted that the battery pack is an electric power source using a secondary battery, and is a so-called assembled battery or the like. The electric vehicle is a vehicle that works (runs) with the use of a secondary battery as a driving electric power source. As described above, the electric vehicle may be an automobile (such as a hybrid automobile) including a drive source other than a secondary battery. The electric power storage system is a system using a secondary battery as an electric power storage source. For example, in a home electric power storage system, since electric power is stored in the secondary battery as an electric power storage source, the electric power is utilized, and thereby, home electric products and the like become usable. The electric power tool is a tool in which a movable section (such as a drill) is moved with the use of a secondary battery as a driving electric power source. The electronic apparatus is an apparatus executing various functions with the use of a secondary battery as a driving electric power source (electric power supply source).

Description will be specifically given of some application examples of the secondary battery. It is to be noted that the configurations of the respective application examples explained below are merely examples, and may be changed as appropriate.

[3-1. Battery Pack]

Figure 11:
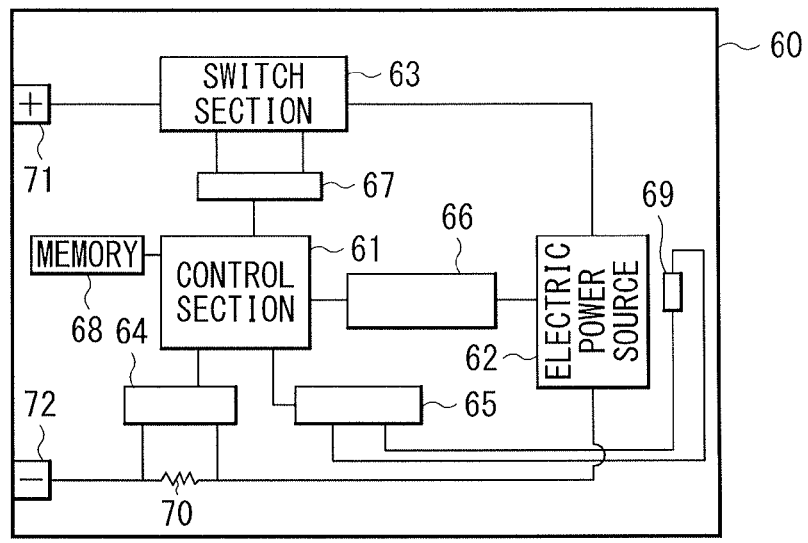
FIG. 11 is a block diagram illustrating a configuration of a battery pack as an application example of the secondary battery.

FIG. 11 illustrates a block configuration of a battery pack. For example, the battery pack may include a control section 61, an electric power source 62, a switch section 63, a current measurement section 64, a temperature detection section 65, a voltage detection section 66, a switch control section 67, a memory 68, a temperature detection element 69, a current detection resistance 70, a cathode terminal 71, and an anode terminal 72 in a housing 60 made of a plastic material and/or the like.

The control section 61 controls operation of the whole battery pack (including operation of the electric power source 62), and may include, for example, a central processing unit (CPU) and/or the like. The electric power source 62 includes one or more secondary batteries (not illustrated). The electric power source 62 may be, for example, an assembled battery including two or more secondary batteries. Connection type of these secondary batteries may be a series-connected type, may be a parallel-connected type, or a mixed type thereof. As an example, the electric power source 62 may include six secondary batteries connected in a manner of dual-parallel and three-series.

The switch section 63 switches the operation of the electric power source 62 (whether or not the electric power source 62 is connectable to an external device) according to an instruction of the control section 61. The switch section 63 may include, for example, a charge control switch, a discharge control switch, a charging diode, a discharging diode, and the like (not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures temperature with the use of the temperature detection element 69, and outputs the measurement result to the control section 61. The temperature measurement result may be used for, for example, a case in which the control section 61 controls charge and discharge at the time of abnormal heat generation or a case in which the control section 61 performs a correction processing at the time of calculating a remaining capacity. The voltage detection section 66 measures a voltage of the secondary battery in the electric power source 62, performs analog-to-digital conversion on the measured voltage, and supplies the resultant to the control section 61.

The switch control section 67 controls operations of the switch section 63 according to signals inputted from the current measurement section 64 and the voltage detection section 66.

The switch control section 67 executes control so that a charging current is prevented from flowing in a current path of the electric power source 62 by disconnecting the switch section 63 (charge control switch) in the case where, for example, a battery voltage reaches an overcharge detection voltage. Thereby, in the electric power source 62, only discharge is allowed to be performed through the discharging diode. It is to be noted that, for example, in the case where a large current flows at the time of charge, the switch control section 67 blocks the charging current.

Further, the switch control section 67 executes control so that a discharging current is prevented from flowing in the current path of the electric power source 62 by disconnecting the switch section 63 (discharge control switch) in the case where, for example, a battery voltage reaches an overdischarge detection voltage. Thereby, in the electric power source 62, only charge is allowed to be performed through the charging diode. It is to be noted that, for example, in the case where a large current flows at the time of discharge, the switch control section 67 blocks the discharging current.

It is to be noted that, in the secondary battery, for example, the overcharge detection voltage may be 4.20 V±0.05 V, and the over-discharge detection voltage may be 2.4 V±0.1 V.

The memory 68 may be, for example, an EEPROM as a non-volatile memory or the like. The memory 68 may store, for example, numerical values calculated by the control section 61 and information of the secondary battery measured in a manufacturing step (such as an internal resistance in the initial state). It is to be noted that, in the case where the memory 68 stores a full charging capacity of the secondary battery, the control section 61 is allowed to comprehend information such as a remaining capacity.

The temperature detection element 69 measures temperature of the electric power source 62, and outputs the measurement result to the control section 61. The temperature detection element 69 may be, for example, a thermistor or the like.

The cathode terminal 71 and the anode terminal 72 are terminals connected to an external device (such as a notebook personal computer) driven using the battery pack or an external device (such as a battery charger) used for charging the battery pack. The electric power source 62 is charged and discharged through the cathode terminal 71 and the anode terminal 72.

[3-2. Electric Vehicle]

Figure 12:
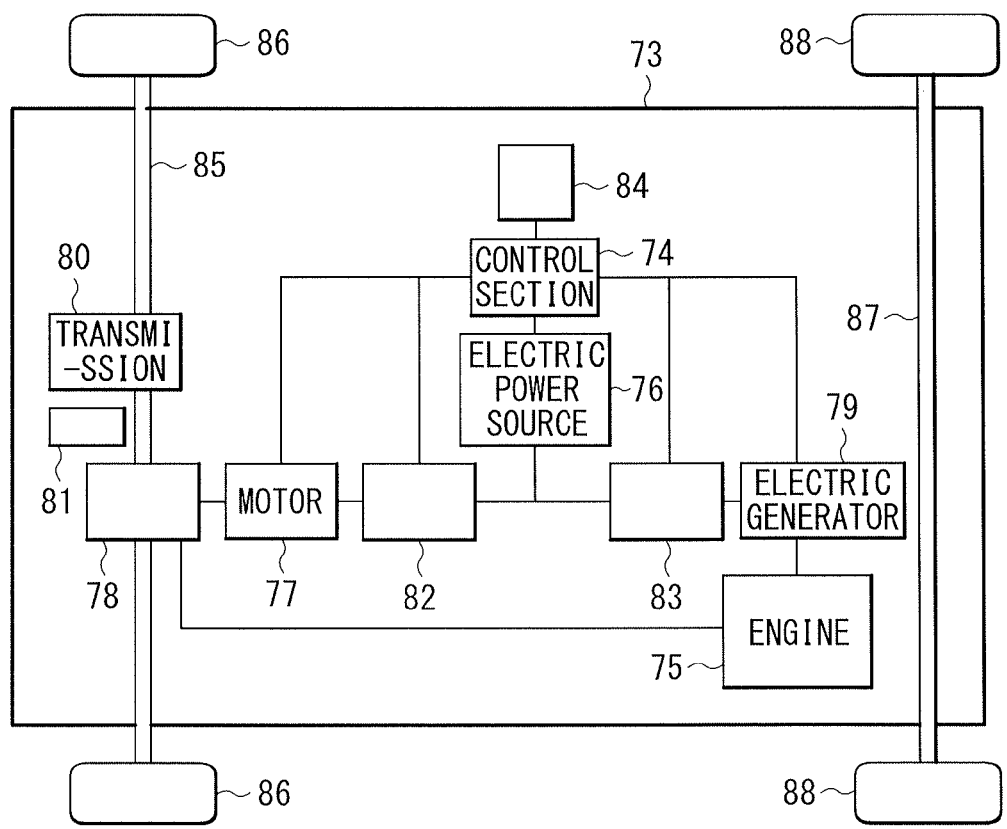
FIG. 12 is a block diagram illustrating a configuration of an electric vehicle as an application example of the secondary battery.

FIG. 12 illustrates a block configuration of a hybrid automobile as an example of electric vehicles. For example, the electric vehicle may include a control section 74, an engine 75, an electric power source 76, a driving motor 77, a differential 78, an electric generator 79, a transmission 80, a clutch 81, inverters 82 and 83, and various sensors 84 in a housing 73 made of metal. In addition thereto, the electric vehicle may include, for example, a front drive shaft 85 and a front tire 86 that are connected to the differential 78 and the transmission 80, a rear drive shaft 87, and a rear tire 88.

The electric vehicle may run with the use of, for example, one of the engine 75 and the motor 77 as a drive source. The engine 75 is a main power source, and may be, for example, a petrol engine. In the case where the engine 75 is used as a power source, drive power (torque) of the engine 75 may be transferred to the front tire 86 or the rear tire 88 through the differential 78, the transmission 80, and the clutch 81 as drive sections, for example. The torque of the engine 75 may also be transferred to the electric generator 79. Due to the torque, the electric generator 79 generates alternating-current electric power. The alternating-current electric power is converted into direct-current electric power through the inverter 83, and the converted power is stored in the electric power source 76. In contrast, in the case where the motor 77 as a conversion section is used as a power source, electric power (direct-current electric power) supplied from the electric power source 76 is converted into alternating-current electric power through the inverter 82. The motor 77 may be driven by the alternating-current electric power. Drive power (torque) obtained by converting the electric power by the motor 77 may be transferred to the front tire 86 or the rear tire 88 through the differential 78, the transmission 80, and the clutch 81 as the drive sections, for example.

It is to be noted that, alternatively, the following mechanism may be adopted. In the mechanism, when speed of the electric vehicle is reduced by an unillustrated brake mechanism, the resistance at the time of speed reduction is transferred to the motor 77 as torque, and the motor 77 generates alternating-current electric power by the torque. It may be preferable that the alternating-current electric power be converted to direct-current electric power through the inverter 82, and the direct-current regenerative electric power be stored in the electric power source 76.

The control section 74 controls operations of the whole electric vehicle, and, for example, may include a CPU and/or the like. The electric power source 76 includes one or more secondary batteries (not illustrated). Alternatively, the electric power source 76 may be connected to an external electric power source, and electric power may be stored by receiving the electric power from the external electric power source. The various sensors 84 may be used, for example, for controlling the number of revolutions of the engine 75 or for controlling opening level (throttle opening level) of an unillustrated throttle valve. The various sensors 84 may include, for example, a speed sensor, an acceleration sensor, an engine frequency sensor, and/or the like.

It is to be noted that the description has been given above of the hybrid automobile as an electric vehicle. However, examples of the electric vehicles may include a vehicle (electric automobile) working with the use of only the electric power source 76 and the motor 77 without using the engine 75.

[3-3. Electric Power Storage System]

Figure 13:
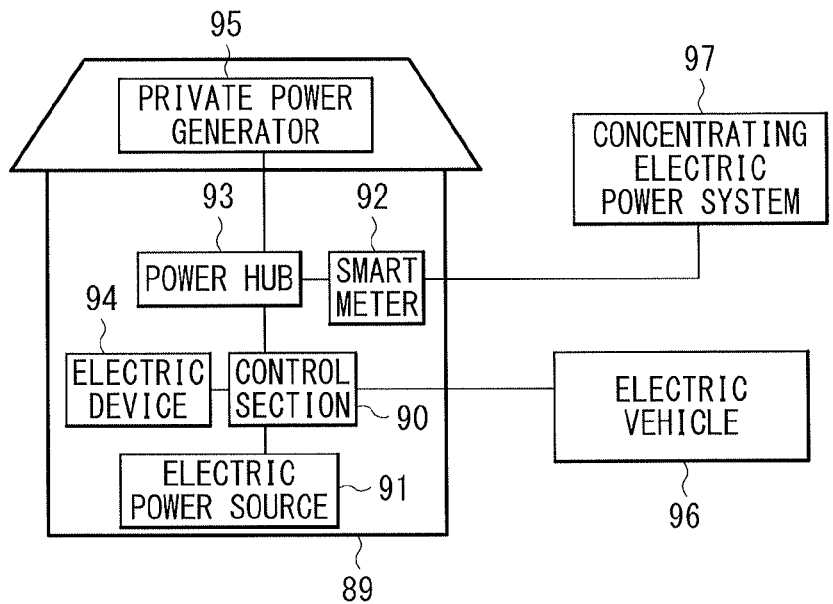
FIG. 13 is a block diagram illustrating a configuration of an electric power storage system as an application example of the secondary battery.

FIG. 13 illustrates a block configuration of an electric power storage system. For example, the electric power storage system may include a control section 90, an electric power source 91, a smart meter 92, and a power hub 93 inside a house 89 such as a general residence and a commercial building.

In this case, the electric power source 91 may be connected to, for example, an electric device 94 arranged inside the house 89, and may be connected to an electric vehicle 96 parked outside the house 89. Further, for example, the electric power source 91 may be connected to a private power generator 95 arranged inside the house 89 through the power hub 93, and may be connected to an external concentrating electric power system 97 thorough the smart meter 92 and the power hub 93.

It is to be noted that the electric device 94 may include, for example, one or more home electric appliances such as a refrigerator, an air conditioner, a television, and a water heater. The private power generator 95 may be, for example, one or more of a solar power generator, a wind-power generator, and the like. The electric vehicle 96 may be, for example, one or more of an electric automobile, an electric motorcycle, a hybrid automobile, and the like. The concentrating electric power system 97 may be, for example, one or more of a thermal power plant, an atomic power plant, a hydraulic power plant, a wind-power plant, and the like.

The control section 90 controls operation of the whole electric power storage system (including operation of the electric power source 91), and, for example, may include a CPU and/or the like. The electric power source 91 includes one or more secondary batteries (not illustrated). The smart meter 92 may be, for example, an electric power meter compatible with a network arranged in the house 89 demanding electric power, and may be communicable with an electric power supplier. Accordingly, for example, while the smart meter 92 communicates with outside, the smart meter 92 controls the balance between supply and demand in the house 89 and allows effective and stable energy supply.

In the electric power storage system, for example, electric power may be stored in the electric power source 91 from the concentrating electric power system 97 as an external electric power source through the smart meter 92 and the power hub 93, and electric power may be stored in the electric power source 91 from the private power generator 95 as an independent electric power source through the power hub 93. The electric power stored in the electric power source 91 is supplied to the electric device 94 or to the electric vehicle 96 according to an instruction of the control section 90. Therefore, the electric device 94 becomes operable, and the electric vehicle 96 becomes chargeable. That is, the electric power storage system is a system capable of storing and supplying electric power in the house 89 with the use of the electric power source 91.

The electric power stored in the electric power source 91 is arbitrarily usable. Therefore, for example, electric power is allowed to be stored in the electric power source 91 from the concentrating electric power system 97 in the middle of the night when an electric rate is inexpensive, and the electric power stored in the electric power source 91 is allowed to be used during daytime hours when an electric rate is expensive.

It is to be noted that the foregoing electric power storage system may be arranged for each household (family unit), or may be arranged for a plurality of households (family units).

[3-4. Electric Power Tool]

Figure 14:
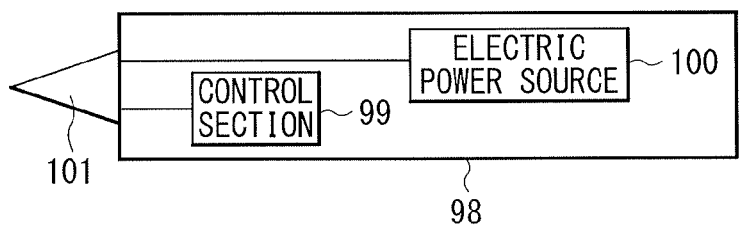
FIG. 14 is a block diagram illustrating a configuration of an electric power tool as an application example of the secondary battery.

FIG. 14 illustrates a block configuration of an electric power tool. For example, the electric power tool may be an electric drill, and may include a control section 99 and an electric power source 100 in a tool body 98 made of a plastic material and/or the like. For example, a drill section 101 as a movable section may be attached to the tool body 98 in an operable (rotatable) manner.

The control section 99 controls operations of the whole electric power tool (including operation of the electric power source 100), and may include, for example, a CPU and/or the like. The electric power source 100 includes one or more secondary batteries (not illustrated). The control section 99 allows electric power to be supplied from the electric power source 100 to the drill section 101 according to operation of an unillustrated operation switch to operate the drill section 101.

EXAMPLES

Specific Examples according to the embodiment of the present application will be described in detail.

Examples 1-1 to 1-8

The laminated-film-type lithium ion secondary battery illustrated in FIG. 9 and FIG. 10 was fabricated by the following procedure.

Upon fabricating the cathode 53, first, 91 parts by mass of a cathode active material ($LiCoO_2$), 6 parts by mass of a cathode electric conductor (graphite), and 3 parts by mass of a cathode binder (polyvinylidene fluoride: PVDF) were mixed to obtain a cathode mixture. Subsequently, the cathode mixture was dispersed in an organic solvent (N-methyl-2-pyrrolidone: NMP) to obtain paste cathode mixture slurry. Subsequently, both surfaces of the cathode current collector 53A (a strip-shaped aluminum foil being 12 µm thick) were coated with the cathode mixture slurry uniformly with the use of a coating device, and the applied cathode mixture slurry was dried to form the cathode active material layer 53B. Finally, the cathode active material layer 53B was compression-molded with the use of a roll pressing machine. In this example, the thickness of the cathode active material layer 53B was adjusted so that lithium metal is not precipitated on the anode 54 at the time of full charge.

Upon fabricating the anode 54, first, an anode active material containing a centering section and a covering section was obtained by the following procedure.

Upon forming the central section, a film made of an active material (silicon oxide) was formed with the use of a resistance heating evaporation source and an induction heating evaporation source inside a vacuum evaporation apparatus using a turbopump. In these examples, the pressure was $1\times10^{-3}$ Pa, and the film formation rate was 100 nm/sec. Thereafter, the formed film was pulverized, and subsequently, the grain diameters thereof were sorted out, and thereby, the central section containing silicon oxide ($SiO_w$) was obtained.

Upon forming the covering section, an electrically-conductive material was deposited on the surface of the central section by a thermal decomposition CVD method. In the thermal decomposition CVD method, methane and acetylene were used as carbon source gas, and argon and hydrogen were used as auxiliary gas. In these examples, conditions such as a compounding ratio between the methane gas and the acetylene gas, heating temperature, and types of auxiliary gas were adjusted to control the physical properties (types of positive ions) of the covering section. It is to be noted that, as a method of forming the covering section, the thermal decomposition CVD method was used in the case where $CH_2$ and/or the like was detected together with C as other ions, while a sputtering method was used in the case where only C was detected as other ions.

Subsequently, an anode active material and a precursor of an anode binder were mixed at a dry weight ratio of 90:10, and thereafter, the resultant mixture was diluted with NMP to obtain paste anode mixture slurry. The precursor of the anode binder was polyamic acid containing NMP and N,N-dimethylacetoamide (DMAC). Subsequently, both surfaces of the anode current collector 54A (a rolled copper foil being 15 μm thick) were coated with the anode mixture slurry with the use of a coating applicator, and the applied anode mixture slurry was dried. Finally, in order to improve binding characteristics, the coated film was thermally pressed, and thereafter, the coated film was fired (at 400 deg C for 1 hour) in the vacuum atmosphere. Thereby, the anode binder (polyimide: PI) was formed, and therefore, the anode active material layer 54B containing the anode active material and the anode binder was formed. It is to be noted that the thickness of the anode active material layer 54B was adjusted so that the anode utilization ratio became 65%.

Positive ion analysis was performed on the anode active material (the covering section) by TOF-SIMS. Accordingly, a plurality of peaks (a plurality of positive ions) were detected in the analytical result (TOF-SIMS spectrum). Types of the positive ions, the ratio D1/D2, and the ratio D1/D3 were as illustrated in Table 1.

Upon preparing an electrolytic solution, an electrolyte salt (LiPF$_6$) was dissolved in a solvent (ethylene carbonate and diethyl carbonate). In these examples, the composition of the solvent was ethylene carbonate:diethyl carbonate=50:50 at a weight ratio, and the content of the electrolyte salt was 1 mol/kg with respect to the solvent.

Upon assembling the secondary battery, first, the cathode lead 51 made of aluminum was welded to one end of the cathode current collector 53A, and the anode lead 52 made of nickel was welded to one end of the anode current collector 54A. Subsequently, the cathode 53, the separator 55, the anode 54, and the separator 55 were laminated in this order, the resultant laminated body was spirally wound in a longitudinal direction to form a spirally wound body as a precursor of the spirally wound electrode body 50. Thereafter, the spirally-winding end thereof was fixed by the protective tape 57 (an adhesive tape). The separator 55 was a multi-layer film (being 20 μm thick) in which a film containing multi-porous polyethylene as a main component was sandwiched between films containing multi-porous polypropylene as a main component. Subsequently, the spirally wound body was sandwiched between the outer package members 60, and subsequently, the outer edges other than one side of the outer package members 60 were thermally fusion-bonded, and thereby, the spirally wound body was contained into the outer package members 60. The outer package member 60 was an aluminum laminated film in which a nylon film (being 30 μm thick), an aluminum foil (being 40 μm thick), and a non-stretched polypropylene film (being 30 μm thick) were laminated from outside. Subsequently, an electrolytic solution was injected from openings of the package members 60, the separator 55 was impregnated with the electrolytic solution, and thereby, the spirally wound electrode body 50 was fabricated. Finally, the openings of the package members 60 were thermally fusion-bonded in the vacuum atmosphere.

The initial charge-discharge characteristics and the cycle characteristics of the secondary battery were examined. Results illustrated in Table 1 were obtained.

Upon examining the initial charge-discharge characteristics, in order to stabilize the battery state, one cycle of charge and discharge was performed on the secondary battery in the ambient temperature environment (23 deg C.). Subsequently, the secondary battery was charged again in the same atmosphere to measure a charging capacity, and thereafter, the secondary battery was discharged to measure a discharging capacity. From the measurement results, [initial efficiency (%)=(discharging capacity/charging capacity)×100] was calculated. At the time of charge at the first cycle, charge was performed at current density of 0.7 mA/cm$^2$ until the voltage reached 4.25 V, and further, charge was performed at a constant voltage of 4.2 V until the current density reached 0.3 mA/cm$^2$. At the time of discharge at the first cycle, discharge was performed at constant current density of 0.7 mA/cm$^2$ until the voltage reached 2.5 V. The charge-discharge conditions at the second cycle were similar to the charge-discharge conditions at the first cycle, except that the current density at the time of charge and at the time of discharge was changed to 3 mA/cm$^2$.

Upon examining the cycle characteristics, a secondary battery with the battery state being stabilized by a procedure similar to that in the case of examining the initial charge-discharge characteristics was used. Such a secondary battery was charged and discharged to measure the discharging capacity at the second cycle. Subsequently, the secondary battery was repeatedly charged and discharged until the total number of cycles reached 100 cycles to measure the discharging capacity at the 100th cycle. From the measurement result, [capacity retention ratio (%)=(discharging capacity at the 100th cycle/discharging capacity at the second cycle)×100] was calculated. Charge-discharge conditions were similar to the charge-discharge conditions (on and after the second cycle) of the initial charge-discharge characteristics.

The surface of the anode active material (the covering section) was observed with the use of SEM. Accordingly, the SEM photographs illustrated in FIG. 2 and FIG. 3 were obtained. FIG. 2 is an SEM photograph of a case (Example 1-1) in which a specific ion was detected by positive ion analysis of the covering section, and FIG. 3 is an SEM photograph of a case (Example 1-6) in which a specific ion was not detected by positive ion analysis of the covering section.

TABLE 1

| | Central section | | Covering section | | | Ratio | Ratio | Initial efficiency | Capacity retention ratio |
| | | | | Positive ion | | | | | |
| Example | Type | w | Type | Other ion | Specific ion | D1/D2 | D1/D3 | (%) | (%) |
| 1-1 | SiO$_w$ | 1.2 | C$_x$H$_y$ | C, CH$_2$, CH$_3$ | C$_2$H$_3$, C$_2$H$_4$, C$_2$H$_5$, C$_3$H$_5$, C$_3$H$_7$, C$_4$H$_8$, C$_4$H$_9$, C$_5$H$_7$, C$_6$H$_5$ | 100 | >1 | 70.5 | 86.0 |

TABLE 1-continued

| Example | Central section Type | w | Covering section Type | Covering section Positive ion Other ion | Covering section Positive ion Specific ion | Ratio D1/D2 | Ratio D1/D3 | Initial efficiency (%) | Capacity retention ratio (%) |
|---|---|---|---|---|---|---|---|---|---|
| 1-2 | | | | | $C_2H_3$, $C_2H_4$, $C_2H_5$, $C_3H_5$, $C_3H_7$, $C_4H_8$, $C_4H_9$, $C_5H_7$ | | | 70.5 | 86.0 |
| 1-3 | | | | | $C_2H_3$, $C_2H_4$, $C_2H_5$, $C_3H_5$, $C_3H_7$, $C_4H_8$, $C_4H_9$ | | | 70.4 | 85.0 |
| 1-4 | | | | | $C_2H_3$, $C_2H_4$, $C_2H_5$ $C_3H_5$, $C_3H_7$, | | | 70.3 | 84.0 |
| 1-5 | | | | | $C_2H_3$, $C_2H_4$, $C_2H_5$, | | | 70.2 | 83.0 |
| 1-6 | | | | | — | — | | 67.0 | 65.0 |
| 1-7 | | | | C | — | — | — | 65.0 | 62.0 |
| 1-8 | | | — | — | — | — | — | 45.0 | 59.0 |

The initial efficiency and the capacity retention ratio were largely changed according to presence or absence of the covering section and the properties thereof (the types of positive ions). More specifically, in the case where the covering section was provided on the central section, the initial efficiency was largely increased and the capacity retention ratio was increased, compared to in the case where the covering section was not formed. Further, in the cases in which the covering section was provided on the central section, when a specific ion was detected by positive ion analysis of the covering section, the initial efficiency was further increased and the capacity retention ratio was largely increased, compared to in the cases where the specific ion was not detected.

In the case where a specific ion was detected by positive ion analysis of the covering section, as illustrated in FIG. 2, a concavo-convex structure attributable to the specific ion was formed on the surface of the covering section. In contrast, in the case where a specific ion was not detected, as illustrated in FIG. 3, a concavo-convex structure attributable to a specific ion was not formed, and the surface of the covering section was substantially flat.

Examples 2-1 to 2-11

Secondary batteries were fabricated by a procedure similar to that of Example 1-1 except that the ratio D1/D2 and the ratio D1/D3 were changed as illustrated in Table 2, and the various characteristics were examined. In these examples, the ratio D1/D2 and the ratio D1/D3 were adjusted by changing conditions such as a compounding ratio between methane gas and acetylene gas, heating temperature, and types of auxiliary gas in a step of forming the covering section by a thermal decomposition CVD method.

TABLE 2

| Example | Central section Type | w | Covering section Type | Covering section Positive ion | Ratio D1/D2 | Ratio D1/D3 | Initial efficiency (%) | Capacity retention ratio (%) |
|---|---|---|---|---|---|---|---|---|
| 2-1 | $SiO_w$ | 1.2 | $C_xH_y$ | C, $CH_2$, $CH_3$, $C_2H_3$, $C_2H_4$, $C_2H_5$, $C_3H_5$, $C_3H_7$, | 0.75 | >1 | 69.6 | 78.0 |
| 2-2 | | | | | 1 | | 69.9 | 79.0 |
| 2-3 | | | | | 1.25 | | 70.0 | 80.0 |
| 2-4 | | | | | 5 | | 70.1 | 81.0 |

TABLE 2-continued

| Example | Central section Type | w | Covering section Type | Covering section Positive ion | Ratio D1/D2 | Ratio D1/D3 | Initial efficiency (%) | Capacity retention ratio (%) |
|---|---|---|---|---|---|---|---|---|
| 2-5 | | | | $C_4H_8$, | 10 | | 70.2 | 83.0 |
| 2-6 | | | | $C_4H_9$, $C_5H_7$, | 50 | | 70.3 | 84.0 |
| 1-1 | | | | $C_6H_5$ | 100 | | 70.5 | 86.0 |
| 2-7 | | | | | 300 | | 70.7 | 87.0 |
| 2-8 | | | | | 500 | | 70.9 | 87.0 |
| 2-9 | | | | | 0.75 | <1 | 67.5 | 71.0 |
| 2-10 | | | | | 1 | | 67.8 | 72.0 |
| 2-11 | | | | | 1.25 | | 67.9 | 73.0 |

In the case where a specific ion was detected by positive ion analysis of the covering section, when the ratio D1/D2 was equal to or larger than 1.25, high initial efficiency equal to or larger than 70% and a high capacity retention ratio equal to or larger than 80% were obtained differently from a case in which the ratio D1/D2 was less than 1.25. When the ratio D1/D2 was equal to or larger than 50, the initial efficiency and the capacity retention ratio were further increased, both of which became substantially the maximum. Further, when the ratio D1/D3 was larger than 1, the initial efficiency and the capacity retention ratio were further increased compared to in a case where the ratio D1/D3 was less than 1.

Examples 3-1 to 3-9

Secondary batteries were fabricated by a procedure similar to that of Example 1-1 except that the average thickness and the average coverage ratio of the covering section were changed as illustrated in Table 3, and the various characteristics were examined. In these examples, the average thickness was adjusted by changing conditions such as a deposition rate and deposition time in a step of forming the covering section, and the average coverage ratio was adjusted by changing conditions such as input electric power and deposition time.

TABLE 3

| | Central section | | Covering section | | Average thickness (nm) | Average coverage ratio (%) | Initial efficiency (%) | Capacity retention ratio (%) |
|---|---|---|---|---|---|---|---|---|
| Example | Type | W | Type | Positive ion | | | | |
| 3-1 | $SiO_w$ | 1.2 | $C_xH_y$ | C, $CH_2$, $CH_3$, | 20 | 80 | 70.0 | 80.0 |
| 3-2 | | | | $C_2H_3$, $C_2H_4$, $C_2H_5$, | 50 | | 70.3 | 82.0 |
| 1-1 | | | | $C_3H_5$, $C_3H_7$, $C_4H_8$, | 100 | | 70.5 | 86.0 |
| 3-3 | | | | $C_4H_9$, $C_5H_7$, $C_6H_5$ | 200 | | 70.5 | 86.0 |
| 3-4 | | | | | 500 | | 70.5 | 86.0 |
| 3-5 | | | | | 1000 | | 70.5 | 85.0 |
| 3-6 | | | | | 100 | 20 | 69.1 | 81.0 |
| 3-7 | | | | | | 30 | 69.4 | 82.0 |
| 3-8 | | | | | | 50 | 70.0 | 84.0 |
| 3-9 | | | | | | 100 | 70.7 | 87.0 |

High initial efficiency and a high capacity retention ratio were obtained without depending on the average thickness of the covering section. However, in the case where the average thickness was larger than 500 nm, since the formation amount of the covering section was excessively large, the battery capacity was lowered. Therefore, in the case where the average thickness was equal to or less than 500 nm, high initial efficiency and a high capacity retention ratio were obtained, and a high battery capacity was obtained as well. Further, in the case where the average coverage ratio of the covering section was equal to or larger than 30%, high initial efficiency and a high capacity retention ratio were obtained.

Examples 4-1 to 4-9

Secondary batteries were fabricated by a procedure similar to that of Example 1-1 except that the ratio IG/ID of the covering section was changed as illustrated in Table 4, and the various characteristics were examined. In these examples, the ratio IG/ID was adjusted by changing conditions such as pressure, thermal decomposition temperature, and types of carbon source gas in a step of forming the covering section.

TABLE 4

| | Central section | | Covering section | | Ratio IG/ID | Initial efficiency (%) | Capacity retention ratio (%) |
|---|---|---|---|---|---|---|---|
| Example | Type | w | Type | Positive ion | | | |
| 4-1 | $SiO_w$ | 1.2 | $C_xH_y$ | C, $CH_2$, $CH_3$, | 0.2 | 68.4 | 79.0 |
| 4-2 | | | | $C_2H_3$, $C_2H_4$, $C_2H_5$, | 0.3 | 70.0 | 81.0 |
| 4-3 | | | | $C_3H_5$, $C_3H_7$, $C_4H_8$, | 0.5 | 70.1 | 82.0 |
| 4-4 | | | | $C_4H_9$, $C_5H_7$, $C_6H_5$ | 1 | 70.3 | 83.0 |
| 4-5 | | | | | 1.5 | 70.4 | 84.0 |
| 1-1 | | | | | 1.8 | 70.5 | 86.0 |
| 4-6 | | | | | 2 | 70.5 | 86.0 |
| 4-7 | | | | | 2.5 | 70.5 | 85.5 |
| 4-8 | | | | | 3 | 70.3 | 82.0 |
| 4-9 | | | | | 3.5 | 69.6 | 79.5 |

In the case where the ratio IG/ID was from 0.3 to 3 both inclusive, high initial efficiency equal to or larger than 70% and a high capacity retention ratio equal to or larger than 80% were obtained, compared to in a case where the ratio IG/ID was out of the foregoing range.

Examples 5-1 to 5-5

Secondary batteries were fabricated by a procedure similar to that of Example 1-1 except that the composition ($SiO_w$) of the central section was changed as illustrated in Table 5, and the various characteristics were examined. In these examples, the composition (the atomic ratio w) was adjusted by changing the oxygen induction amount at the time of melting and solidification of silicon as a raw material.

TABLE 5

| | Central section | | Covering section | | Initial efficiency (%) | Capacity retention ratio (%) |
|---|---|---|---|---|---|---|
| Example | Type | w | Type | Positive ion | | |
| 5-1 | $SiO_w$ | 0.1 | $C_xH_y$ | C, $CH_2$, $CH_3$, | 82.0 | 70.0 |
| 5-2 | | 0.3 | | $C_2H_3$, $C_2H_4$, $C_2H_5$, | 79.0 | 75.0 |
| 5-3 | | 0.8 | | $C_3H_5$, $C_3H_7$, $C_4H_8$, | 74.0 | 80.0 |
| 1-1 | | 1.2 | | $C_4H_9$, $C_5H_7$, $C_6H_5$ | 70.5 | 86.0 |
| 5-4 | | 1.6 | | | 68.0 | 86.0 |
| 5-5 | | 1.9 | | | 66.0 | 83.0 |

In the case where the atomic ratio w was equal to or larger than 0.3, a high capacity retention ratio was obtained while high initial efficiency was retained compared to in a case where the atomic ratio w was less than 0.3. Further, in the case where the atomic ratio w was less than 1.9, high initial efficiency was obtained while a high capacity retention ratio was retained compared to in a case where the atomic ratio w was equal to or larger than 1.9.

Examples 6-1 to 6-9

Secondary batteries were fabricated by a procedure similar to that of Example 1-1 except that the atomic ratio (Si/O) on the surface of the central section was changed as illustrated in Table 6, and the various characteristics were examined. In these examples, the atomic ratio was adjusted by changing conditions such as a supply amount of hydrogen gas and heating temperature in a step of reducing the surface of the central section by heating the central section while supplying the hydrogen gas. It is to be noted that the term "transition" illustrated in Table 6 refers to transition of the atomic ratio in a direction from the surface of the central section to the inside thereof.

TABLE 6

| Example | Central section Type | Si/O w | (atomic %) | Transition | Covering section Type | Positive ion | Initial efficiency (%) | Capacity retention ratio (%) |
|---|---|---|---|---|---|---|---|---|
| 6-1 | $SiO_w$ | 1.2 | 20 | Increased | $C_xH_y$ | C, $CH_2$, $CH_3$, | 67.3 | 77.0 |
| 6-2 | | | 25 | | | $C_2H_3$, $C_2H_4$, | 67.5 | 79.0 |
| 6-3 | | | 30 | | | $C_2H_5$, | 68.2 | 81.0 |
| 6-4 | | | 30 | Constant | | $C_3H_5$, $C_3H_7$, | 69.7 | 87.5 |
| 6-5 | | | 50 | Decreased | | $C_4H_8$, | 70.1 | 87.0 |
| 1-1 | | | 50 | Constant | | $C_4H_9$, $C_5H_7$, | 70.5 | 86.0 |
| 6-6 | | | 70 | Decreased | | $C_6H_5$ | 70.7 | 81.0 |
| 6-7 | | | 75 | | | | 70.9 | 77.0 |
| 6-8 | | | 80 | | | | 71.0 | 71.2 |
| 6-9 | | | 85 | | | | 71.1 | 71.0 |

In the case where the atomic ratio was equal to or less than 75 atomic %, the capacity retention ratio was largely increased. Further, in the case where the atomic ratio was from 30 atomic % to 70 atomic % both inclusive, a high capacity retention ratio equal to or larger than 80% was obtained. In these examples, in the case where the transition of the atomic ratio was in a decreased state or a constant state, the initial efficiency and the capacity retention ratio were further increased compared to in a case where the transition of the atomic ratio was in an increased state.

Examples 7-1 to 7-6

Secondary batteries were fabricated by a procedure similar to that of Example 1-1 except that the median diameter (D50) of the central section was changed as illustrated in Table 7, and the various characteristics were examined. In these examples, the median diameter was adjusted by changing pulverization conditions of the formed film and the like.

TABLE 7

| Example | Central section Type | w | D50 (μm) | Covering section Type | Positive ion | Initial efficiency (%) | Capacity retention ratio (%) |
|---|---|---|---|---|---|---|---|
| 7-1 | $SiO_w$ | 1.2 | 0.06 | $C_xH_y$ | C, $CH_2$, $CH_3$, | 66.0 | 79.0 |
| 7-2 | | | 0.1 | | $C_2H_3$, $C_2H_4$, $C_2H_5$, | 69.2 | 80.5 |
| 7-3 | | | 1 | | $C_3H_5$, $C_3H_7$, $C_4H_8$, | 70.3 | 82.0 |
| 1-1 | | | 5 | | $C_4H_9$, $C_5H_7$, $C_6H_5$ | 70.5 | 86.0 |
| 7-4 | | | 10 | | | 70.7 | 83.0 |
| 7-5 | | | 20 | | | 70.5 | 80.0 |
| 7-6 | | | 30 | | | 69.5 | 73.0 |

In the case where the median diameter (D50) was from 0.1 μm to 20 μm both inclusive, the initial efficiency and the capacity retention ratio were further increased, and in particular, a high capacity retention ratio equal to or larger than 80% was obtained.

Examples 8-1 to 8-12

Secondary batteries were fabricated by a procedure similar to that of Example 1-1 except that the average area occupancy and the average grain diameter of crystal grains in the central section were changed as illustrated in Table 8, and the various characteristics were examined. In these examples, the average area occupancy and the average grain diameter were adjusted by changing conditions such as temperature and time at the time of heating thereof in a step of depositing silicon oxide while heating the same in the argon gas atmosphere.

TABLE 8

| Example | Central section Type | w | Average area occupancy (%) | Average grain diameter (nm) | Covering section Type | Positive ion | Initial efficiency (%) | Capacity retention ratio (%) |
|---|---|---|---|---|---|---|---|---|
| 1-1 | $SiO_w$ | 1.2 | — | — | $C_xH_y$ | C, $CH_2$, $CH_3$, | 70.5 | 86.0 |
| 8-1 | | | 1 | 3 | | $C_2H_3$, $C_2H_4$, | 70.5 | 85.8 |
| 8-2 | | | 10 | 17.5 | | $C_2H_5$, | 70.6 | 85.3 |
| 8-3 | | | 20 | 22 | | $C_3H_5$, $C_3H_7$, | 70.7 | 84.3 |
| 8-4 | | | 25 | 25 | | $C_4H_8$, | 70.8 | 83.2 |
| 8-5 | | | 30 | 27.5 | | $C_4H_9$, $C_5H_7$, | 71.0 | 83.1 |
| 8-6 | | | 35 | 30 | | $C_6H_5$ | 72.0 | 82.0 |
| 8-7 | | | 35 | 35 | | | 73.0 | 81.0 |
| 8-8 | | | 35 | 41.5 | | | 73.5 | 80.0 |
| 8-9 | | | 35 | 50 | | | 74.0 | 79.6 |
| 8-10 | | | 35 | 55 | | | 74.5 | 75.4 |
| 8-11 | | | 40 | 60 | | | 75.0 | 73.3 |
| 8-12 | | | 40 | 70 | | | 75.5 | 73.0 |

In the case where the average area occupancy was equal to or less than 35% and the average grain diameter was equal to or less than 30 nm, the initial efficiency and the capacity retention ratio were further increased.

Examples 9-1 to 9-9

Secondary batteries were fabricated by a procedure similar to that of Example 1-1 except that a metal element was contained in the central section as illustrated in Table 9, and the various characteristics were examined. In these examples, co-evaporation was performed with the use of silicon oxide powder and metal powder in a step of forming the central section.

TABLE 9

| Example | Central section Type | w | Metal Element Type | Content (weight %) | Covering section Type | Positive ion | Initial efficiency (%) | Capacity retention ratio (%) |
|---|---|---|---|---|---|---|---|---|
| 9-1 | $SiO_w$ | 1.2 | Fe + Al | 0.4 + 0.3 | $C_xH_y$ | C, $CH_2$, $CH_3$, | 70.9 | 86.0 |
| 9-2 | | | Fe + Al + Ca | 0.4 + 0.2 + 0.1 | | $C_2H_3$, $C_2H_4$, $C_2H_5$, | 71.0 | 86.2 |

TABLE 9-continued

| | | | Central section | | | | Capacity |
|---|---|---|---|---|---|---|---|
| | | | Metal Element | | | Initial | retention |
| | | | | Content | Covering section | efficiency | ratio |
| Example | Type | w | Type | (weight %) | Type Positive ion | (%) | (%) |
| 9-3 | | | Fe + Al + Mn | 0.4 + 0.2 + 0.1 | $C_3H_5, C_3H_7, C_4H_8,$ | 70.9 | 86.1 |
| 9-4 | | | Fe + Al + Ca | 0.2 + 0.07 + 0.02 | $C_4H_9, C_5H_7, C_6H_5$ | 71.1 | 86.3 |
| 9-5 | | | Fe + Al + Ca | 0.23 + 0.08 + 0.02 | | 70.9 | 86.3 |
| 9-6 | | | Fe + Mn | 0.4 + 0.3 | | 71.0 | 86.3 |
| 9-7 | | | Fe + Cr | 0.4 + 0.3 | | 71.1 | 86.2 |
| 9-8 | | | Fe + Mg | 0.4 + 0.3 | | 71.1 | 86.1 |
| 9-9 | | | Fe + Ni | 0.4 + 0.3 | | 71.1 | 86.1 |

In the case where the central section contained a metal element, one or both of the initial efficiency and the capacity retention ratio were further increased.

Examples 10-1 and 10-2

Secondary batteries were fabricated by a procedure similar to that of Example 1-1 except that the anode active material was pre-doped with lithium as illustrated in Table 10, and the various characteristics were examined. In these examples, the anode active material and the like and lithium metal powder were mixed, and subsequently, the resultant mixture was heated (heating temperature: 500 deg C.) in the inactive gas (Ar) atmosphere (a powder mixing method). Further, after the anode 54 was fabricated, lithium metal was deposited on the anode 54 with the use of an evaporation method.

TABLE 10

| Example | Central section | | Covering section | | Pre-doping method | Initial efficiency (%) | Capacity retention ratio (%) |
|---|---|---|---|---|---|---|---|
| | Type | w | Type | Positive ion | | | |
| 10-1 | $SiO_w$ | 1.2 | $C_xH_y$ | C, $CH_2$, $CH_3$, $C_2H_3$, $C_2H_4$, $C_2H_5$, $C_3H_5$, $C_3H_7$, $C_4H_8$, $C_4H_9$, $C_5H_7$, $C_6H_5$ | Powder mixing method | 83.0 | 86.4 |
| 10-2 | | | | | Evaporation method | 84.0 | 86.8 |

In the case where the central section was pre-doped, the initial efficiency and the capacity retention ratio were further increased.

Examples 11-1 and 11-9

Secondary batteries were fabricated by a procedure similar to that of Example 1-1 except that the type of the anode binder was changed as illustrated in Table 11, and the various characteristics were examined. In these examples, as an anode binder, polyamideimide (PAI), polyvinylidene fluoride (PVDF), polyamide (PA), polyacrylic acid (PAA), lithium polyacrylate (PAALi), polyimide carbide (PI carbide), polyethylene (PE), polymaleic acid (PMA), and aramid (AR) were used. It is to be noted that when PAA or PAALi was used, anode mixture slurry was prepared with the use of 17 volume % aqueous solution (containing 1.5 wt % of polyethylene particles) obtained by dissolving PAA or PAAL in pure water, the resultant anode mixture slurry was thermally pressed to form the anode active material layer 54B without firing.

TABLE 11

| | Anode active material | | | | | Initial | Capacity |
|---|---|---|---|---|---|---|---|
| | Central section | | Covering section | | Anode | efficiency | retention ratio |
| Example | Type | w | Type | Positive ion | binder | (%) | (%) |
| 11-1 | $SiO_w$ | 1.2 | $C_xH_y$ | C, $CH_2$, $CH_3$, | PAI | 70.5 | 86.0 |
| 11-2 | | | | $C_2H_3, C_2H_4, C_2H_5,$ | PVDF | 71.0 | 85.0 |
| 11-3 | | | | $C_3H_5, C_3H_7, C_4H_8,$ | PA | 70.5 | 86.0 |
| 11-4 | | | | $C_4H_9, C_5H_7, C_6H_5$ | PAA | 71.1 | 86.0 |
| 11-5 | | | | | PAALi | 71.0 | 85.0 |
| 11-6 | | | | | PI carbide | 71.0 | 86.0 |
| 11-7 | | | | | PE | 70.8 | 86.0 |
| 11-8 | | | | | PMA | 70.8 | 85.0 |
| 11-9 | | | | | AR | 70.9 | 86.0 |

In the case where the type of the anode binder was changed, high initial efficiency and a high capacity retention ratio were obtained.

Examples 12-1 to 12-3

Secondary batteries were fabricated by a procedure similar to that of Example 1-1 except that carbon and sulfur were contained in the anode current collector 54A as illustrated in Table 12, and the various characteristics were examined. In these examples, as the anode current collector 54A, a rolled copper foil doped with carbon and sulfur was used.

TABLE 12

| | Anode current collector Content of C and S | Anode active material | | | | Initial | Capacity |
|---|---|---|---|---|---|---|---|
| | | Central section | | Covering section | | efficiency | retention ratio |
| Example | (ppm) | Type | w | Type | Positive ion | (%) | (%) |
| 12-1 | 50 | $SiO_w$ | 1.2 | $C_xH_y$ | C, $CH_2$, $CH_3$, | 70.5 | 86.3 |
| 12-2 | 100 | | | | $C_2H_3, C_2H_4, C_2H_5,$ | 70.5 | 86.4 |
| 12-3 | 200 | | | | $C_3H_5, C_3H_7, C_4H_8,$ $C_4H_9, C_5H_7, C_6H_5$ | 70.5 | 86.3 |

In the case where the anode current collector 54A contained carbon and sulfur, the initial efficiency and the capacity retention ratio were further increased. In these examples, when the sum of the carbon content and the sulfur content was equal to or less than 100 ppm, the capacity retention ratio was further increased.

From the results of Table 1 to Table 12, in the case where a specific ion was detected by the positive ion analysis of the covering section with the use of TOF-SIMS in the covering section provided on the central section containing silicon as a constituent element, superior initial charge and discharge characteristics were obtained, and superior cycle characteristics were obtained.

The present application has been described with reference to the embodiment and Examples. However, the present application is not limited to the examples described in the embodiment and Examples, and various modifications may be made. For example, the secondary battery of the present application is similarly applicable to a secondary battery in which the anode capacity includes a capacity by inserting and extracting lithium ions and a capacity associated with precipitation and dissolution of lithium metal, and the battery capacity is expressed by the sum of these capacities. In this case, an anode material capable of inserting and extracting lithium ions is used, and the chargeable capacity of the anode material is set to a smaller value than the discharging capacity of the cathode.

Further, for example, the secondary battery of the present application is similarly applicable to a battery having other battery structure such as a coin-type battery and a button-type battery and a battery in which the battery element has other structure such as a laminated structure.

Further, for example, the electrode reactant may be other Group 1 element such as sodium (Na) and potassium (K), a Group 2 element such as magnesium (Mg) and calcium (Ca), or other light metal such as aluminum (Al). The effect of the present application may be obtained without depending on the electrode reactant type, and therefore, even if the electrode reactant type is changed, a similar effect is obtainable.

Further, in the embodiment and Examples, with regard to the physical properties (the ratio D1/D2 and the ratio D1/D3) of the covering section, the appropriate ranges derived from the results of Examples were described. However, such description does not totally deny possibility that the ratio D1/D2 and the ratio D1/D3 would be out of the foregoing ranges. That is, the foregoing appropriate ranges are particularly preferable ranges for obtaining the effects of the present application. Therefore, as long as the effects of the present application are obtained, the ratio D1/D2 and the ratio D1/D3 may be somewhat out of the foregoing ranges. The same is applicable to other numerical ranges (such as a range of an atomic ratio) specified in claims.

It is possible to achieve at least the following configurations from the above-described example embodiments of the disclosure.

(1) A secondary battery including:
  a cathode;
  an anode including an active material; and
  an electrolytic solution, wherein
  the active material includes a central section and a covering section provided on a surface of the central section,
  the central section includes silicon (Si) as a constituent element,
  the covering section includes carbon (C) and hydrogen (H) as constituent elements, and
  one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

(2) The secondary battery according to (1), wherein a ratio D1/D2 between a sum D1 of detected intensities of positive ions represented by $C_2H_3$, $C_2H_5$, and $C_3H_5$ and a detected intensity D2 of C is equal to or larger than about 1.25, or is equal to or larger than about 50.

(3) The secondary battery according to (1) or (2), wherein a ratio D1/D3 between a sum D1 of detected intensities of positive ions represented by $C_2H_3$, $C_2H_5$, and $C_3H_5$ and a sum D3 of detected intensities of positive ions represented by $CH_z$ (z satisfies $0 \leq z \leq 3$) is larger than about 1.

(4) The secondary battery according to any one of (1) to (3), wherein
  an average thickness of the covering section is equal to or less than about 500 nanometers,
  an average coverage ratio of the covering section with respect to the central section is equal to or larger than about 30 percent, and
  a ratio IG/ID between an intensity IG of a G band and an intensity ID of a D band of the covering section measured by Raman spectrum method is from about 0.3 to about 3 both inclusive.

(5) The secondary battery according to any one of (1) to (4), wherein a surface of the covering section has a concavo-convex structure attributable to one or more of the positive ions represented by the $C_xH_y$ ($2 \leq x \leq 6$, $3 \leq y \leq 9$).

(6) The secondary battery according to any one of (1) to (5), wherein the central section includes oxygen (O) as a constituent element.

(7) The secondary battery according to (6), wherein
  the central section includes silicon oxide represented by $SiO_w$ (w satisfies $0.3 \leq w < 1.9$), and
  on the surface of the central section, an atomic ratio (Si/O) of silicon with respect to oxygen is equal to or less than about 75 atomic percent, or is from about 30 atomic percent to about 70 atomic percent both inclusive.

(8) The secondary battery according to any one of (1) to (7), wherein a median diameter (D50) of the central section is from about 0.1 micrometers to about 20 micrometers both inclusive.

(9) The secondary battery according to any one of (1) to (8), wherein the central section includes one or more of iron (Fe), aluminum (Al), calcium (Ca), manganese (Mn), chromium (Cr), magnesium (Mg), and nickel (Ni) as constituent elements.

(10) The secondary battery according to any one of (1) to (9), wherein
  in the central section, crystal regions (crystal grains) are scattered in noncrystalline regions,
  average area occupancy of crystal grains attributable to a (111) plane and a (220) plane of silicon is equal to or less than about 35 percent, and
  an average grain diameter of the crystal grains is equal to or less than about 30 nanometers.

(11) The secondary battery according any one of (1) to (10), wherein
  in the central section in an uncharged state, part or all silicon is alloyed with lithium (Li), and
  the central section includes lithium silicate.

(12) The secondary battery according to any one of (1) to (11), wherein
  the anode includes an active material layer on a current collector,
  the active material layer includes the active material, the current collector includes copper (Cu), carbon (C), and sulfur (S) as constituent elements, and a sum of contents of carbon and sulfur in the current collector is equal to or less than about 100 parts per million.

(13) The secondary battery according to any one of (1) to (12), wherein the secondary battery is a lithium ion secondary battery.

(14) An electrode including an active material, wherein the active material includes a central section and a covering section provided on a surface of the central section, the central section includes silicon (Si) as a constituent element, the covering section includes carbon (C) and hydrogen (H) as constituent elements, and one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

(15) An active material including:

a central section; and a covering section provided on a surface of the central section, wherein the central section includes silicon (Si) as a constituent element, the covering section includes carbon (C) and hydrogen (H) as constituent elements, and one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

(16) A battery pack including:

a secondary battery;

a control section configured to control operation of the secondary battery; and a switch section configured to switch the operation of the secondary battery according to an instruction of the control section, wherein the secondary battery includes a cathode, an anode including an active material, and an electrolytic solution, the active material includes a central section and a covering section provided on a surface of the central section, the central section includes silicon (Si) as a constituent element, the covering section includes carbon (C) and hydrogen (H) as constituent elements, and one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

(17) An electric vehicle including:

a secondary battery;

a conversion section configured to convert electric power supplied from the secondary battery into drive power;

a drive section configured to operate according to the drive power; and a control section configured to control operation of the secondary battery, wherein the secondary battery includes a cathode, an anode including an active material, and an electrolytic solution, the active material includes a central section and a covering section provided on a surface of the central section, the central section includes silicon (Si) as a constituent element, the covering section includes carbon (C) and hydrogen (H) as constituent elements, and one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

(18) An electric power storage system including:

a secondary battery;

one or more electric devices configured to be supplied with electric power from the secondary battery; and a control section configured to control the supplying of the electric power from the secondary battery to the one or more electric devices, wherein the secondary battery includes a cathode, an anode including an active material, and an electrolytic solution, the active material includes a central section and a covering section provided on a surface of the central section, the central section includes silicon (Si) as a constituent element, the covering section includes carbon (C) and hydrogen (H) as constituent elements, and one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

(19) An electric power tool including:

a secondary battery; and a movable section configured to be supplied with electric power from the secondary battery, wherein the secondary battery includes a cathode, an anode including an active material, and an electrolytic solution, the active material includes a central section and a covering section provided on a surface of the central section, the central section includes silicon (Si) as a constituent element, the covering section includes carbon (C) and hydrogen (H) as constituent elements, and one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

(20) An electronic apparatus including a secondary battery as an electric power supply source, wherein the secondary battery includes a cathode, an anode including an active material, and an electrolytic solution, the active material includes a central section and a covering section provided on a surface of the central section, the central section includes silicon (Si) as a constituent element, the covering section includes carbon (C) and hydrogen (H) as constituent elements, and one or more of positive ions represented by $C_xH_y$ (x and y satisfy $2 \leq x \leq 6$ and $3 \leq y \leq 9$) are detected by positive ion analysis of the covering section with the use of time-of-flight secondary ion mass spectrometry.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a cathode;
an anode including an active material; and
an electrolytic solution, wherein
the active material includes a central section and a covering section provided on a surface of the central section,
the central section includes silicon (Si) as a constituent element,
the covering section includes carbon (C) and hydrogen (H) as constituent elements, and
one or more of positive ions represented by CxHy wherein x and y satisfy $2 \leq x \leq 6$ and $3 \leq y \leq 9$, are detected by positive ion analysis of the covering section with the use of time-of-flight secondary ion mass spectrometry.

2. The secondary battery according to claim 1, wherein a ratio D1/D2 between a sum D1 of detected intensities of positive ions represented by C2H3, C2H5, and C3H5 and a detected intensity D2 of C is equal to or larger than about 1.25, or is equal to or larger than about 50, wherein D1 is the sum of detected intensities of positive ions represented by C2H3, C2H5, and C3H5, and wherein D2 is the detected intensity of carbon.

3. The secondary battery according to claim 1, wherein a ratio D1/D3 between a sum D1 of detected intensities of positive ions represented by C2H3, C2H5, and C3H5 and a sum D3 of detected intensities of positive ions represented by CHz (z satisfies $0 \leq z \leq 3$) is larger than about 1, wherein D1 is the sum of detected intensities of positive ions represented by C2H3, C2H5, and C3H5, and wherein D3 is the sum of detected intensity of positive ions represented by CHz wherein z satisfies $0 \leq z \leq 3$.

4. The secondary battery according to claim 1, wherein
an average thickness of the covering section is equal to or less than about 500 nanometers, and
an average coverage ratio of the covering section with respect to the central section is equal to or larger than about 30 percent.

5. The secondary battery according to claim 1, wherein a surface of the covering section has a concavo-convex structure attributable to one or more of the positive ions represented by the CxHy, wherein x and y satisfy $2 \leq x \leq 6$ and $3 \leq y \leq 9$.

6. The secondary battery according to claim 1, wherein the central section includes oxygen (O) as a constituent element.

7. The secondary battery according to claim 6, wherein the central section includes silicon oxide represented by SiOw (w satisfies $0.3 \leq w \leq 1.9$), and on the surface of the central section, an atomic ratio (Si/O) of silicon with respect to oxygen is equal to or less than about 75 atomic percent, or is from about 30 atomic percent to about 70 atomic percent both inclusive.

8. The secondary battery according to claim 1, wherein a median diameter (D50) of the central section is from about 0.1 micrometers to about 20 micrometers both inclusive.

9. The secondary battery according to claim 1, wherein the central section includes one or more of iron (Fe), aluminum (Al), calcium (Ca), manganese (Mn), chromium (Cr), magnesium (Mg), and nickel (Ni) as constituent elements.

10. The secondary battery according to claim 1, wherein
in the central section, crystal regions (crystal grains) are scattered in noncrystalline regions,
average area occupancy of crystal grains attributable to a (111) plane and a (220) plane of silicon is equal to or less than about 35 percent, and
an average grain diameter of the crystal grains is equal to or less than about 30 nanometers.

11. The secondary battery according to claim 1, wherein
in the central section in an uncharged state, part or all silicon is alloyed with lithium (Li), and
the central section includes lithium silicate.

12. The secondary battery according to claim 1, wherein
the anode includes an active material layer on a current collector,
the active material layer includes the active material,
the current collector includes copper (Cu), carbon (C), and sulfur (S) as constituent elements, and
a sum of contents of carbon and sulfur in the current collector is equal to or less than about 100 parts per million.

13. The secondary battery according to claim 1, wherein the secondary battery is a lithium ion secondary battery.

14. An electrode comprising an active material, wherein
the active material includes a central section and a covering section provided on a surface of the central section,
the central section includes silicon (Si) as a constituent element,
the covering section includes carbon (C) and hydrogen (H) as constituent elements, and
one or more of positive ions represented by CxHy wherein x and y satisfy $2 \leq x \leq 6$ and $3 \leq y \leq 9$, are detected by positive ion analysis of the covering section with the use of time-of-flight secondary ion mass spectrometry.

* * * * *